United States Patent
Aboulaich et al.

(10) Patent No.: US 11,198,814 B2
(45) Date of Patent: Dec. 14, 2021

(54) METHOD FOR PRODUCING PHOTOLUMINESCENT PARTICLES

(71) Applicants: Aledia, Echirolles (FR); Universite Clermont Auvergne, Clermont-Ferrand (FR); Centre National de la Recherche Scientifique, Paris (FR); Sigma Clermont, Aubiere (FR)

(72) Inventors: Abdelhay Aboulaich, Clermont-Ferrand (FR); Geneviève Chadeyron, Cebazat (FR); Rachid Mahiou, Clermont-Ferrand (FR)

(73) Assignees: Aledia, Echirolles (FR); Université Clermont Auvergne, Clermont Ferrand (FR); Centre National de la Recherche Scientifique, Paris (FR); Sigma Clermont, Aubiere (FR)

( * ) Notice: Subject to any disclaimer, the term of this patent is extended or adjusted under 35 U.S.C. 154(b) by 266 days.

(21) Appl. No.: 16/309,070

(22) PCT Filed: Jun. 30, 2017

(86) PCT No.: PCT/FR2017/051773
§ 371 (c)(1),
(2) Date: Dec. 11, 2018

(87) PCT Pub. No.: WO2018/002556
PCT Pub. Date: Jan. 4, 2018

(65) Prior Publication Data
US 2019/0241804 A1 Aug. 8, 2019

(30) Foreign Application Priority Data

Jun. 30, 2016 (FR) .................................. 1656171

(51) Int. Cl.
*C09K 11/77* (2006.01)
*B82Y 40/00* (2011.01)
(Continued)

(52) U.S. Cl.
CPC .......... *C09K 11/7774* (2013.01); *B82Y 40/00* (2013.01); *C09K 11/025* (2013.01);
(Continued)

(58) Field of Classification Search
CPC .............. C09K 11/7774; C09K 11/025; C09K 11/7706; C09K 11/7721; B82Y 40/00
See application file for complete search history.

(56) References Cited

U.S. PATENT DOCUMENTS 8,801,968 B2  8/2014 Petry et al.
2013/0221279 A1  8/2013 Xu et al.

OTHER PUBLICATIONS

International Search Report for International Application No. PCT/FR2017/051773, dated Oct. 26, 2017.
(Continued)

*Primary Examiner* — C Melissa Koslow
(74) *Attorney, Agent, or Firm* — Wolf, Greenfield & Sacks, P.C.

(57) ABSTRACT

A method of manufacturing nanoparticles of a photoluminescent material, including the successive steps of: a) forming nanometer-range particles of said photoluminescent material; b) forming a dispersion containing the particles in a non-aqueous solvent, the dispersion further containing at least one surface agent; c) placing the dispersion in an autoclave at a pressure in the range from 2 MPa to 100 MPa; and d) recovering the particles.

20 Claims, 11 Drawing Sheets

(51) Int. Cl.
 C09K 11/02 (2006.01)
 C09K 11/08 (2006.01)
(52) U.S. Cl.
 CPC .......... C09K 11/08 (2013.01); C09K 11/7706 (2013.01); C09K 11/7721 (2013.01); *C01P 2004/64* (2013.01)

(56) References Cited

OTHER PUBLICATIONS

Iijima et al., Surface Mofidication for Improving the Stability of Nanoparticles in Liquid Media. KONA Powder and Particle Journal. 2009;27:119-29.
Nien et al., Improved Photoluminescence of $Y_3Al_5O_{12}$:Ce Nanoparticles by Silica Coating. Journal of the American Ceramic Society. 2010;93(6):1688-91.
Written Opinion for International Application No. PCT/FR2017/051773, dated Oct. 26, 2017.
International Preliminary Report on Patentability for International Application No. PCT/FR2017/051773, dated Jan. 10, 2019.

METHOD FOR PRODUCING PHOTOLUMINESCENT PARTICLES

This application is a national stage filing under 35 U.S.C. § 371 of International Patent Application Serial No. PCT/FR2017/051773, filed Jun. 30, 2017, which claims priority to French application FR16/56171, filed Jun. 30, 2016. The entire contents of these applications are incorporated herein by reference in their entireties.

BACKGROUND

The present application relates to methods of manufacturing particles of a photoluminescent material.

DISCUSSION OF THE RELATED ART

A photoluminescent material, also called phosphor, is capable, when it is excited by light at a first wavelength, of emitting light at a second wavelength different from the first wavelength. Photoluminescent materials are particularly used to prepare fluorescent coatings, in particular to manufacture display screens, projectors, particularly plasma screens, lamps for the backlighting of liquid crystal displays, light-emitting diodes, plasma lamps, trichromatic lamps, etc.

An example of a photoluminescent material is yttrium aluminum garnet (YAG) activated by the trivalent cerium ion ($Y_3Al_5O_{12}$:$Ce^{3+}$) also called YAG:Ce or YAG:$Ce^{3+}$. Such a photoluminescent material is particularly used to generate white light after being associated with a blue light-emitting diode (LED). To achieve this, the blue LED is covered with a coating containing YAG:$Ce^{3+}$ particles. Part of the blue light is converted into yellow light by the photoluminescent coating, which enables to obtain white light.

Photoluminescent materials may be manufactured by solid-state reactions. For example, in the case of YAG:Ce, solid precursors of aluminum, of yttrium, and of cerium, in the form of powders, are mixed, milled, and heated at high temperatures, for example, to temperatures higher than 1,600° C., to form a powder of particles having the desired composition and crystal phase. The powder is then annealed under a reducing atmosphere, generally under hydrogen ($H_2$), to reduce the $Ce^{4+}$ ions, which have no photoluminescence properties, and which act as getters for the charge carriers, into $Ce^{3+}$ ions which have the desired photoluminescence properties. The obtained photoluminescent particles have a crystal structure of good quality. They may then be dispersed in a matrix, for example, resin, to form a photoluminescent coating.

Methods of manufacturing particles of a photoluminescent material comprising solid-state reactions enable to manufacture particles having an average size greater than one micrometer, for example, varying from 10 µm to 15 µm. For certain applications, it is desirable to manufacture particles having an average size smaller than 1 µm, such particles being indifferently called nanoparticles, nanometer-range particles, or sub-micron particles hereafter. This particularly occurs when a fluid or viscous composition comprising photoluminescent particles is desired to be formed to implement a so-called additive method of application of the photoluminescent particles, for example, by direct printing of the composition comprising the photoluminescent particles at the desired locations. However, the forming of a fluid composition comprising photoluminescent particles which is stable over time requires the use of nanoparticles.

To manufacture nanoparticles, it is known to implement a so-called top-down synthesis method, which comprises milling particles of the photoluminescent material having an average size greater than one micrometer obtained by solid-state reactions, for example, in a ball mill, to decrease the average particle size. However, the milling operation causes the forming of defects at the surface of the obtained particles, which results in a decrease of the photoluminescent performance of the photoluminescent nanoparticles, particularly of the external quantum efficiency of the particles. Further, phenomena of agglomeration of the nanometer-range particles obtained by milling can be observed, which causes the forming of particle clusters of large dimensions.

It is known to form particles of a photoluminescent material by so-called bottom-up methods, which enable to obtain sub-micron particles. Bottom-up synthesis methods are methods of chemical synthesis which are based on the assembling of chemical entities of small dimensions (atoms or molecules) to form objects of larger sizes, nanoparticles in the case in point. Among bottom-up methods, the sol-gel method and the solvothermal or hydrothermal method can for example be mentioned. The common point of bottom-up methods is the fact that nanoparticle syntheses are generally carried out at temperatures lower than those of solid-state reactions. Due to such low synthesis temperatures, photoluminescent nanoparticles generally suffer from a low degree of crystallinity causing structure defects which are often associated with charge carrier or luminescence "traps". Thus, the performance in terms of light efficiency of the photoluminescent nanoparticles obtained by such methods is much lower than that of photoluminescent particles having an average size greater than one micrometer manufactured by solid-state reactions.

It would be desirable to obtain a powder of nanoparticles of a photoluminescent material having a performance, particularly in terms of light efficiency, higher than that obtained for nanoparticles of the same photoluminescent material obtained by bottom-up methods.

SUMMARY

An object of an embodiment aims at overcoming all or part of the disadvantages relative to the previously-described photoluminescent particle manufacturing methods.

Another object of an embodiment is for the average particle size to be smaller than 1 µm.

Another object of an embodiment is for 100% of the particles ($d_{100}$) to have a size smaller than 1 µm.

Another object of an embodiment comprises remedying the surface defects of the nanoparticles obtained after a milling step.

Another object of an embodiment is for the external quantum efficiency of the nanometer-range particles to be greater than 60% and for the internal quantum efficiency to be at least equal to 70%.

Another object of an embodiment is to allow the forming of colloidal dispersions which are stable in time.

Another object of an embodiment is for the surface of the synthesized nanoparticles to be compatible with the solvent(s) and/or the encapsulants used to form a phosphor.

Another object of an embodiment is for the dispersions of photoluminescent nanoparticles to be compatible with the method of depositing the phosphor on the light-emitting diodes.

Another object of an embodiment is that the nanoparticles form a stable suspension in a photosensitive resin composition.

Another object of an embodiment is that the nanoparticles form a stable suspension in a composition of acrylate type photosensitive resin.

Thus, an embodiment provides a method of manufacturing nanoparticles of a photoluminescent material, comprising the successive steps of:

a) forming nanometer-range particles of said photoluminescent material;

b) forming a dispersion containing the particles in a non-aqueous solvent, the dispersion further containing at least one surface agent;

c) placing the dispersion in an autoclave at a pressure in the range from 2 MPa to 100 MPa; and d) recovering the particles.

According to an embodiment, step b) is preceded by a surface treatment of the nanometer-range particles by a silica precursor.

According to an embodiment, the surface agent is a silane-type coupling agent that is an organofunctional compound having the following chemical formula:

$$R_nSiX_{4-n}$$

where n is equal to 1, 2, or 3, X designates a hydrolysable group, and R is a non-hydrolysable organic group.

According to an embodiment, X is an alkoxy group, a halide group, or an amine group.

According to an embodiment, the non-aqueous solvent is an alcohol.

According to an embodiment, step a) comprising milling particles of said photoluminescent material having an average size greater than 1 µm to obtain the nanometer-range particles.

According to an embodiment, the particles of said photoluminescent material having an average size greater than 1 µm are milled in a wet environment.

According to an embodiment, the particles of said photoluminescent material having an average size greater than 1 µm are milled in a solvent different from the non-aqueous solvent used at step b).

According to an embodiment, the duration of step c) is in the range from 30 minutes to 48 hours.

According to an embodiment, the temperature in the autoclave is in the range from 25° C. to 300° C.

According to an embodiment, the photoluminescent material is an aluminate, a silicate, a nitride, an oxynitride, a fluoride, or a sulfide.

According to an embodiment, the photoluminescent material mainly comprises an yttrium aluminum oxide or a lutetium aluminum oxide further containing at least one of the following elements: cerium, europium, chromium, neodymium, terbium, dysprosium, praseodymium, or gadolinium.

According to an embodiment, the method further comprises, before step c), a step of mixing and treating in the autoclave nanometer-range particles in the presence of all or part of the precursors used to form the nanometer-range particles.

According to an embodiment, the method further comprises, before step c), a step of mixing the nanometer-range particles with at least one photoluminescent substance.

According to an embodiment, the photoluminescent substance is a quantum dot.

According to an embodiment, the nanometer-range particles are quantum dots.

BRIEF DESCRIPTION OF THE DRAWINGS

The foregoing and other features and advantages will be discussed in detail in the following non-limiting description of dedicated embodiments in connection with the accompanying drawings, among which.

DETAILED DESCRIPTION

Figure 1:
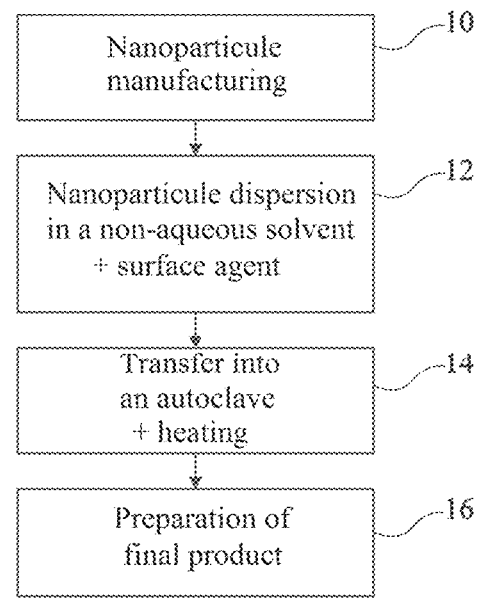
FIG. 1 shows in the form of a block diagram an embodiment of a method of manufacturing nanometer-range particles of a photoluminescent material.

For clarity, the same elements have been designated with the same reference numerals in the different drawings. Further, in the following description, expressions "substantially", "around", and "approximately" mean "to within 10%".

Term "particles of a material" designates unit elements of the material. Term "particle" such as used in the context of the present disclosure should be understood in a broad sense and corresponds not only to compact particles having a more or less spherical shape but also to angular particles, to flattened particles, to flake-shaped particles, to fiber-shaped particles, or to fibrous particles, etc. It should be understood that the "size" of particles in the context of the present invention means the smallest transverse dimension of the particles. As an example, in the case of fiber-shaped particles, the particle size corresponds to the diameter of the fibers.

Term "average size" means according to the present invention the particle size which is greater than the size of 50% by volume of the particles and smaller than the size of 50% by volume of the particles of a particle distribution. This corresponds to the $d_{50}$. Thus, an average size which is smaller than the size of 100% by volume of the particles of a distribution corresponds to the $d_{100}$. Micron-range particle means a particle having an average size in the range from 1 μm to 100 μm, typically from 1 μm to 50 μm. Nanoparticles means particles having an average size smaller than 1 μm, preferably in the range from 5 nm to 500 nm. The particle size of the micron-range particles may be measured by laser diffraction analysis by for example using a Malvern Mastersizer 2000. The particle size of the submicron particles or nanoparticles may be measured by dynamic light scattering (DLS) by using, for example, a Malvern Zetasizer Nano ZS.

An embodiment of the method of manufacturing nanoparticles of a photoluminescent material comprises forming a dispersion of nanoparticles in a non-aqueous solvent with at least one surface agent, and maintaining the dispersion in an autoclave at a temperature in the range from 50° C. to 300° C. and a pressure in the range from 2 MPa to 100 MPa, preferably from 2 MPa to 10 MPa, for from 30 minutes to 48 hours. The nanometer-range particles can be obtained by milling of particles having an average size greater than 1 μm obtained by solid-state manufacturing methods. As a variation, the nanoparticles may be directly formed by bottom-up methods.

FIG. 1 shows, in the form of a block diagram, an embodiment of a method of manufacturing nanoparticles of a photoluminescent material. The method comprises successive steps 10 to 16.

At step 10, nanoparticles of a photoluminescent material are manufactured.

According to an embodiment, the photoluminescent material is an aluminate, a silicate, a nitride, an oxynitride, a fluoride, or a sulfide. As an example, the photoluminescent material is capable of emitting light at a wavelength in the range from 400 nm to 700 nm under a luminous excitation at a wavelength in the range from 250 nm to 500 nm, preferably from 360 nm to 480 nm.

More specifically, according to an embodiment, the photoluminescent material mainly comprises an yttrium aluminum oxide or a lutetium aluminum oxide further containing at least one of the following elements: cerium, europium, chromium, neodymium, terbium, dysprosium, praseodymium, or gadolinium.

According to an embodiment, the photoluminescent material mainly comprises an aluminate, particularly an yttrium aluminum garnet according to the following formula (1):

or a lutetium aluminum garnet according to the following formula (2):

where R1 and R2 are independently selected from the elements comprising rare earths, alkaline earths, and transition metals and x and y each independently vary from 0 to 1. Preferably, R1 and R2 are independently selected from the group comprising cerium, samarium, gadolinium, silicon, barium, terbium, strontium, chromium, praseodymium, gallium, europium, neodymium, and dysprosium.

As an example of nitrides absorbing and emitting light in the desired wavelength ranges, the following can be mentioned: $CaAlSiN_3$:Eu, $(Ca,Sr)AlSiN_3$:Eu. $Ca_2Si_5N_8$:Eu, or $(Ca,Sr)Si_5N_8$:Eu.

As an example of fluorides absorbing and emitting light in the desired wavelengths, fluorides of formula $X_2MF_6$:Mn (where X may be K or Na and M may be Si, Ge, Sn, or Ti) can be mentioned.

As an example of sulfides absorbing and emitting light in the desired wavelength ranges, the following can be mentioned: CaS:Eu, SrCa:Eu, (Sr,Ca)S:Eu, and $SrGa_2S_4$:Eu.

As an example of aluminates absorbing and emitting light in the desired wavelength ranges, the following can be mentioned: $Y_3Al_5O_{12}$:Ce, $(Y,Gd)_3Al_5O_{12}$:Ce, $Tb_3Al_5O_{12}$, $(Y,Tb)_3Al_5O_{12}$, $Lu_3Al_5O_{12}$:Ce, and $Y_3(Al,Ga)_5O_{12}$.

As an example of silicates absorbing and emitting light in the desired wavelength ranges, the following can be mentioned: $(Sr,Ba)_2SiO_4$:Eu, $Sr_2SiO_4$:Eu, $Ba_2SiO_4$:Eu, $Ca_2SiO_4$:Eu, $Ca_3SiO_5$:Eu, and $Sr_3SiO_5$:Eu.

At step 12, a colloidal dispersion of the photoluminescent particles in a non-aqueous solvent, that is, comprising less than 0.02 wt. % of water, is formed. The non-aqueous solvent is preferably a polar protic non-aqueous solvent. According to an embodiment, the non-aqueous solvent is an alcohol, particularly selected from the group comprising methanol, ethanol, propanol, butanol, pentanol, hexanol, and isopropanol. According to an embodiment, the colloidal dispersion comprises from 10 mg to 100 mg of photoluminescent particles per ml of solvent (10 mg/ml-100 mg/ml).

At step 14, a functionalization of the nanometer-range particles is performed. To achieve this, the colloidal dispersion is placed in an autoclave.

At step 16, the final product is prepared. The final product is for example in the form of a liquid solution, a viscous solution, a powder, a coating or a deposit on substrate, in particular a substrate for light-emitting diode, in the form of a solid film, etc.

Figure 2:
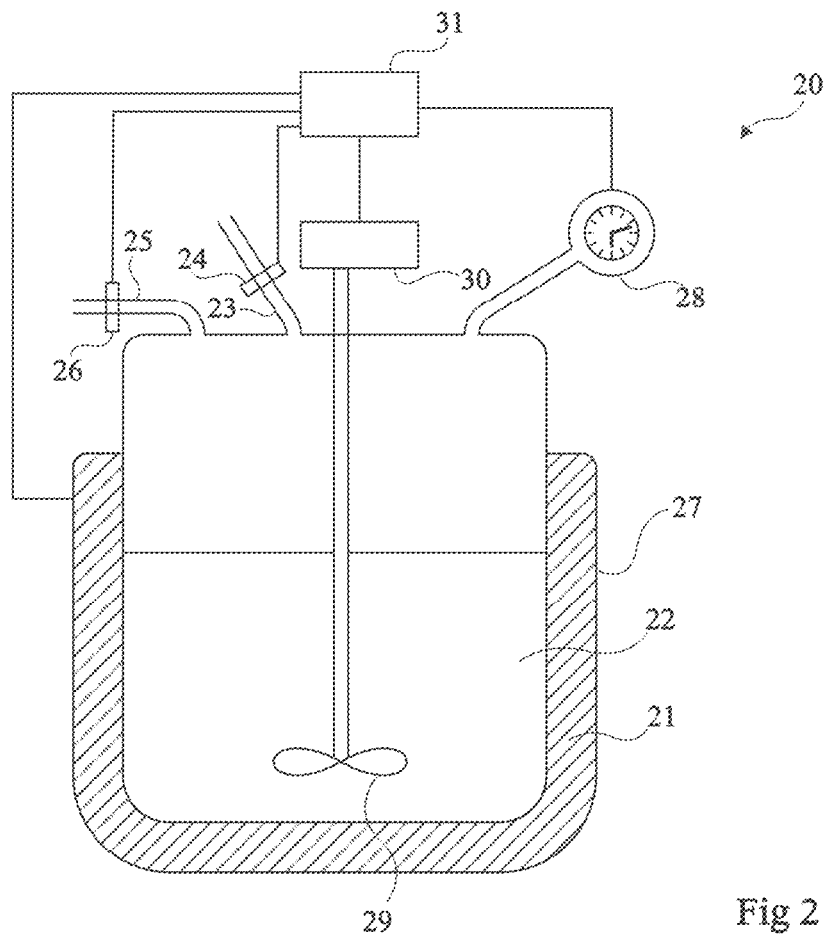
FIG. 2 is a partial simplified cross-section view of an autoclave.

FIG. 2 shows an embodiment of an autoclave 20 capable of being used at step 14. Autoclave 20 comprises a chamber 21 having product 22 to be treated placed therein. A duct 23 enables to introduce gas into chamber 21. The opening and the closing of duct 23 are controlled by a gate 24. A duct 25 enables to take samples from chamber 21. The opening and the closing of duct 25 are controlled by a gate 26. Chamber 21 is partially surrounded with a heater band 27. A pressure sensor 28 enables to measure the pressure in chamber 21. A stirrer 29 driven by a motor 30 enables to stir product 22 in chamber 21. A control unit 31, for example comprising a computer, is connected to pressure sensor 28, to heater band 27, to gates 24, 26, and to motor 30. Control unit 31 is capable of controlling heater band 27 and gates 24, 26. Control unit 31 enables to regulate the temperature and the pressure in chamber 21 and may control the starting and the stopping of stirrer 29.

Considering FIG. 1 again, according to an embodiment, the pressure in the autoclave is kept substantially constant for the entire duration of step 14. As an example, the pressure in the autoclave may vary from 20 bars (2 MPa) to 100 bars (10 MPa) according to the solvent used and the heating temperature. The pressure may also be adjusted by the introduction of a gas, for example, nitrogen, into the autoclave. According to an embodiment, the temperature in the autoclave is kept substantially constant for the entire duration of step 14. As an example, the temperature in the autoclave is in the range from 25° C. to 300° C., preferably from 150° C. to 250° C. A stirring of the particles in the dispersion may be performed in the autoclave.

According to an embodiment, at least one surface agent is added to the colloidal dispersion of photoluminescent particles before its placing in the autoclave.

According to an embodiment, the surface agent is a silane-type coupling agent. Expression "silane-type coupling agent" or "silane coupling agent" means according to the present description a reactant capable of binding by chemical bonds or physical bonds with a matrix or a solvent having the particles dispersed therein and capable of chemically binding with the particle surface. Each silane coupling agent comprises a first portion capable of binding with the matrix or the solvent and a second portion capable of binding with the particle surface. According to an embodiment, the colloidal dispersion comprises from 1 mg to 100 mg of coupling agents per ml of solvent. The mass ratio between the silane coupling agent and the luminescent nanoparticles may vary from 5 to 0.01, preferably between 3 and 0.1. The silane coupling agents tend to distribute at the periphery of each photoluminescent particle and of forming a layer of variable density surrounding each particle.

A silane coupling agent is an organofunctional compound having the following chemical formula (3):

$$R_n SiX_{4-n} \quad (3)$$

where n is equal to 1, 2, or 3, X designates a hydrolysable group, particularly an alkoxy group, a halide group, or an amine group, and R is a non-hydrolysable organic group. As an example, the organosilane has formula $R_n Si(OR')_{4-n}$.

According to another embodiment, the surface agent is a compound having the following chemical formula (4):

$$R—Y—R' \quad (4)$$

Y is a chain comprising at least one atom selected from the group comprising carbon, hydrogen, and oxygen. Y is called spacer. The spacer enables to adjust in certain cases the hydrophilic/hydrophobic character of the photoluminescent particle. The spacer may further enable to adjust the distance between photoluminescent particles. R and R' may be identical and belong to the following chemical groups: thiol (—SH), carboxylic acid (—COOH), hydroxyl (—OH), amine (—NH2) or acrylate. They may also be non-reactive group such as polyethylene glycol (—PEG) or an aromatic group. R and R' can also be mono-functional (with only one functional group), bi-functional (2 functional groups), tri-functional (3 functional groups) or tetra-functional (4 functional groups).

Figure 3:
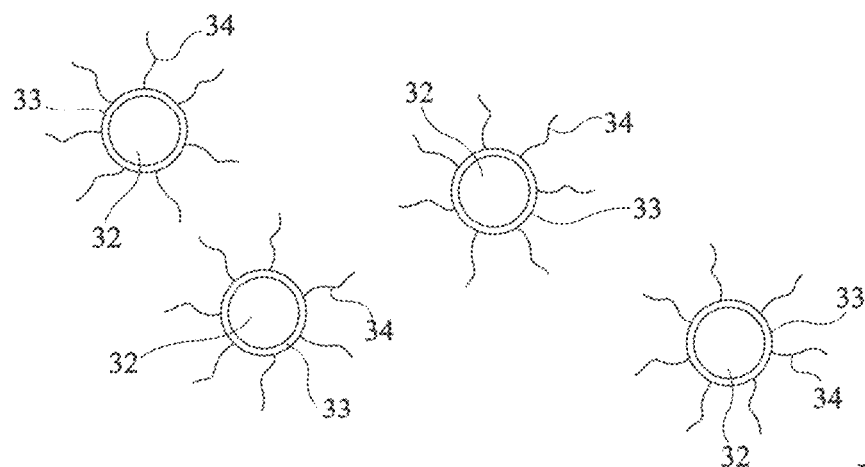
FIG. 3 is a partial simplified cross-section view of nanoparticles of a photoluminescent material obtained by the method illustrated in FIG. 1.

FIG. 3 is a partial simplified cross-section view of photoluminescent nanoparticles obtained at the end of step 14 according to an embodiment of method of manufacture of the colloidal dispersion. Each particle 32 of the photoluminescent material is surrounded with a coupling agent layer 31. Each particle 32 may be more or less fully covered by the coupling agents. All the portions of the coupling agents which are not capable of binding with the particle are directed towards the outside of the particle, which is illustrated by appendage 34 in FIG. 3.

According to an embodiment, the silane coupling agents are selected from the group for example comprising:

n-propyltrimethoxysilane, allyltrimethoxysilane, n-propyltriethoxysilane, trimethoxy(7-octen-1-yl)silane, trimethoxy(octadecyl)silane, n-octyltrimethoxysilane, n-octyltriethoxysilane, methoxy(triethyleneoxy)propyltrimethoxysilane, 3-aminopropyltri-methoxysilane, phenyltrimethoxysilane, dimethoxy(methyl)octylsilane, 3-mercaptopropyltrimethoxysilane, 3-(methacryloyloxy)propyltrimethoxysilane, 3-isocyanatopropyltriethoxysilane, 3-isocyanatopropyltrimethoxysilane, 2-[methoxy(polyethyleneoxy)6-9-propyl]trimethoxysilane, 3-glycidoxypropyltrimethoxysilane, N-(3-acryloxy-2-hydroxypropyl)-3-aminopropyltriethoxysilane, and bis[3-(triethoxysilyl)propyl] urea.

According to an embodiment, the silane coupling agents may be carbon chlorosilanes such as for example: chloro (dimethyl)octadecylsilane, chloro(dodecyl)dimethylsilane, or chloro(decyl)dimethylsilane, or fluorinated chlorosilanes such as for example: chloro-dimethyl(3,3,3trifluoropropyl) silane or perfluorodecyltrichlorosilane.

According to an embodiment, the coupling agents may further react together at the particle surface and form a new compound which totally or partly surrounds each particle.

According to an embodiment, the organosilanes react in the non-aqueous solvent to form Si—O—Si bonds. Advantageously, the reaction of the organosilanes in a non-aqueous medium does not cause the forming of silanols (Si—OH). It is admitted that the presence of hydroxyl-type groups (—OH), such as for example the Si—OH groups, at the surface of the photoluminescent particles, has a negative effect on the light output of the particles (particularly because these groups form traps for charge carriers).

As an example, it is known that the reaction of a silicon chloride (SiCl$_4$) with an anhydrous ether of formula R—O—R may provide SiO$_2$ particles with surface groups of Si—OR type only according to the following equations (5), (6), and (7):

$$\text{Hydrolysis: Si—Cl+R—O—R} \rightarrow \text{Si—OR+R—Cl} \quad (5)$$

$$\text{Condensation via: Si—OR+Si—Cl} \rightarrow \text{Si—O—Si+R—Cl} \quad (6)$$

$$\text{or via: Si—OR+Si—OR} \rightarrow \text{Si—O—Si+R—O—R} \quad (7)$$

Figure 4:
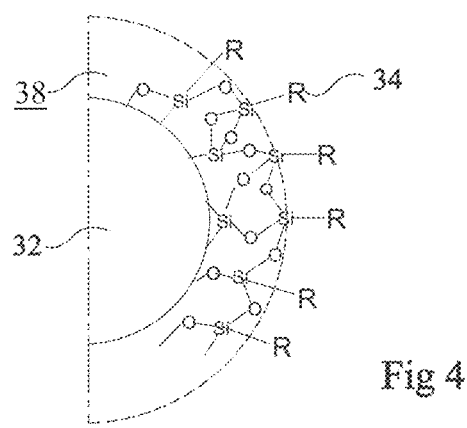
FIG. 4 is a partial simplified cross-section of a detail of a portion of a nanoparticle shown in FIG. 3.

FIG. 4 is a partial simplified cross-section view of a particle 32 surrounded by a siloxane layer 38 of variable density obtained by the forming of Si—O—Si bonds between silane coupling agents. The R groups are directed towards the outside of particle 32.

According to a variation, step 14 may comprise a step of surface treatment with all or part of the precursors used to construct the photoluminescent particle. This step may be carried out before or during the functionalization step, preferably before the surface functionalization step. For example, a surface treatment in the presence of an yttrium, aluminum, cerium, and oxygen source may be used to treat the surface of the YAG:Ce nanoparticles. For Ca$_2$MgSi$_2$O$_7$: Eu nanoparticles, all or part of the silicon, magnesium, calcium, europium, and oxygen sources may be mixed with the nanoparticles heated in the autoclave as previously described. The precursors will react together in the dispersion and form a layer which totally or partly surrounds each particle.

Figure 5:
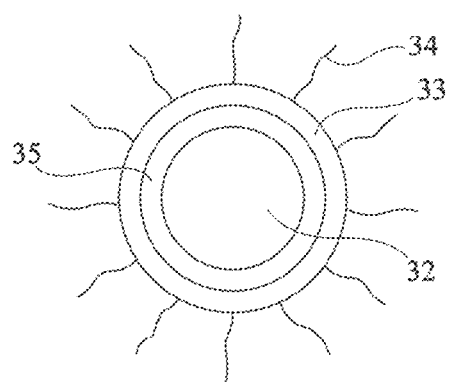
FIGS. 5 to 7 are partial simplified cross-section views of a particle of a photoluminescent material obtained by variations of the method illustrated in FIG. 1.

FIG. 5 is a partial simplified cross-section view, of a particle 32 obtained at the end of step 14 when a step of surface treatment with all or part of the precursors used to construct the photoluminescent particle has been carried out. The precursors have reacted together in the dispersion and have formed a layer 35 which totally or partly surrounds particle 32.

According to another variation, one or a plurality of photoluminescent substances may be added to the mixture of step 14. The photoluminescent substance(s) may be of organic, inorganic, or hybrid type, emitting or not at the same emission wavelength as particle 20. At the end of step 14, the photoluminescent substance will be located inside of the layer formed by the coupling agents or outside of this layer.

Figure 6:
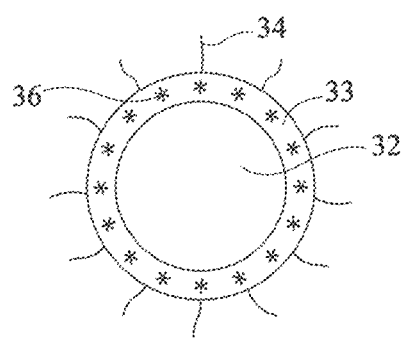

FIG. 6 is a partial simplified cross-section view of a particle 32 obtained at the end of step 14 when photoluminescent substances are added to the mixture at step 14. Photoluminescent substances 36 have been trapped in layer 33.

According to an embodiment, the photoluminescent substance may be a quantum dot. The quantum dot may be bound to the layer formed by the coupling agents by covalent chemical bonds. For example, 3-mercaptopropyltrimethoxysilane may be used as a coupling agent. The trimethoxysilane groups will form covalent bonds with the surface of the photoluminescent particle while the thiol (—SH) group directed towards the outside of the particle will form a covalent bond with the surface of the quantum dot.

Figure 7:
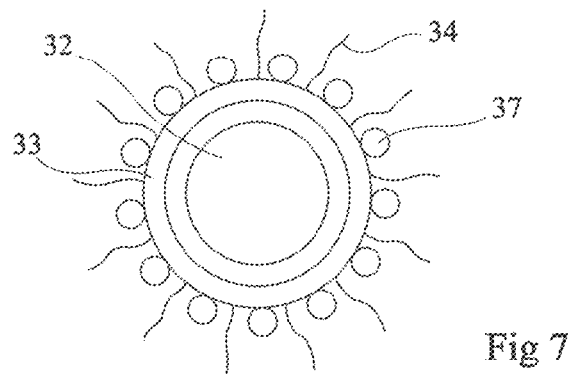

FIG. 7 is a partial simplified cross-section view of a particle 32 obtained at the end of step 14 for which quantum dots 37 are bonded to the surface of layer 33.

The duration of step 14 may be in the range from 30 minutes to a plurality of days, preferably from 30 minutes to 48 hours, preferably from 10 hours to 20 hours. The heating time particularly depends on the heating temperature, on the solvent, and on the surface agents used.

According to an embodiment, functionalization step 14 may be preceded by an additional step of treatment of the surface of the nanoparticles obtained at step 12. This step may comprise mixing the nanoparticle dispersion with silica precursors at room temperature for a duration which varies from 1 hour to 24 hours. The silica precursor is for example TEOS. The reaction can then be carried out in the presence of ammonia ($NH_4OH$) according to Stöber's method, for example. The pretreatment step is followed by the recovery and the cleaning of the nanoparticles to remove the silica precursors which have not reacted with the particle surface and possibly ammonia, and functionalization step 14 may be carried out as described previously.

Step 16 comprises preparing a final product adapted to the targeted application. Step 16 may comprise recovering the particles in the colloidal dispersion obtained at the end of step 14. The recovery step may comprise a step of nanoparticle precipitation, for example, by addition of an antisolvent for the nanoparticles. "Antisolvent" means any solvent which has no "chemical" affinity for the nanoparticles. The selection of the antisolvent will depend on the nature and on the surface chemistry of the nanoparticles. The antisolvents generally are aprotic polar solvents such as acetone or protic polar solvents such as ethanol. As a variation, the solid phase containing the nanoparticles may be recovered by centrifugation. Step 16 may be followed by a particle purification step, particularly to remove precursors which would not have reacted and the parasitic reaction products, as well as the solvent(s) used at step 14. The nanoparticles are then dried, for example, at a temperature in the range from 25° C. to 80° C., for a time period in the range from 1 hr to 12 hrs. A nanoparticle powder is then obtained.

The nanoparticle powder obtained at step 16 may be added to a solvent, optionally further comprising a binder, for example, a resin, to form a fluid or viscous composition of photoluminescent particles. The surface agents bound to the photoluminescent particles may be selected to improve the compatibility between the photoluminescent particles and the solvent and/or the binder, for example, to increase the photoluminescent particle dispersion in the solvent and/or the binder.

The method of application of the photoluminescent composition, particularly to form a coating, may correspond to a so-called additive method, for example, by direct printing of the photoluminescent composition at the desired locations, for example, by inkjet printing, photogravure, silk-screening, flexography, spray coating, drop casting or by dipping of the substrate into the photoluminescent nanoparticle solution (dip coating).

Figure 8:
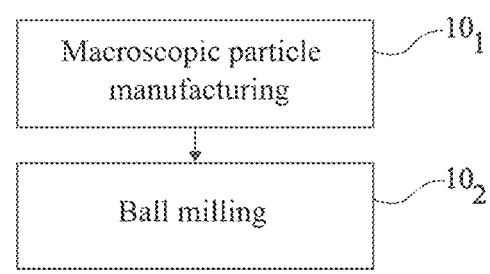
FIG. 8 shows in the form of a block diagram a more detailed embodiment of a step of the nanoparticle manufacturing method illustrated in FIG. 1.

FIG. 8 shows, in the form of a block diagram, an embodiment of previously-described step 10 of manufacturing nanoparticles of the photoluminescent material. The method comprises successive steps $10_1$ and $10_2$.

At step $10_1$, particles having an average size greater than 1 μm are formed by a known method of manufacturing particles of the photoluminescent material. As an example, the method comprises solid-state reactions. As an example, solid precursors the components of the photoluminescent material in the form of powders are mixed, milled, and heated at high temperatures, for example, to temperatures higher than 1.600° C., to form a powder of particles having the desired composition and crystal phase. The powder may be annealed under a reducing atmosphere, for example, under hydrogen ($H_2$).

At the end of step $10_1$, the average size of the photoluminescent particles is greater than 1 μm and may be in the range from 10 μm to 15 μm.

At step $10_2$, the average size of the photoluminescent particles obtained at step $10_1$ is decreased by milling of the particles, for example, by using a ball mill. The milling is preferably a wet milling where the particles are dispersed in a solvent. The solvent is preferably a non-aqueous solvent, particularly a polar protic non-aqueous solvent. According to an embodiment, the non-aqueous solvent is an alcohol, preferably selected from the group comprising methanol, ethanol, propanol, butanol, pentanol, hexanol, and isopropanol, particularly ethanol. At the end of step $10_2$, the average size of the photoluminescent particles is smaller than 1 μm, for example, in the range from 100 nm to 500 nm.

The solvent used at step $10_2$ may be the same as that which is used afterwards at step 12. When the solvent used at step 12 is the same as that used at step $10_2$, the colloidal dispersion of photoluminescent nanoparticles used at step 12 may correspond to the dispersion obtained at the end of step $10_2$. However, it may be advantageous to use at step 12 a solvent which is different from the solvent used at step $10_2$. Indeed, it may be desirable to use a first solvent at step $10_2$ which improves the performance of the milling operation, for example, a solvent having a low viscosity, and a second solvent better adapted to the treatment applied at step 14, for example, a solvent having a higher boiling temperature than the solvent used at step $10_2$.

According to another embodiment, the method implemented at step 10 of manufacturing nanoparticles of the photoluminescent material directly provides nanometer-range particles substantially with no forming of particles having an average size greater than one micrometer. As an example, the nanoparticle forming method is a hydrothermal method. According to an embodiment, the nanoparticles are quantum dots.

The quantum dots are pure semiconductor nanocrystals (Si, Ge) or compounds of type II-VI (CdS, CdSe, CdTe, ZnO, ZnSe, ZnS), III-V (GaAs, InP, InAs, GaN), IV-VI (PbS, PbSe, PbTe), I-VII (CuCl), V-VI ($Bi_2Te_3$), or II-V ($Cd_3As$, $Zn_3P_2$, $Zn_3As_2$), having a diameter generally in the range from 2 nm to 10 nm. As a direct consequence of the "quantum confinement" phenomenon, such materials then have fluorescence properties adjustable by the control of their size. Two major methods of colloidal synthesis of quantum dots have been developed in the last fifteen years: so-called "metal-organic" and "hydrothermal" syntheses. Metal-organic synthesis is based on the rapid injection of a precursor A at high temperature (270° C.-300° C.) and of a precursor B (for example, in the case of CdSe, A corresponds to $Se^{2-}$ and B corresponds to $Cd^{2+}$) into coordinating solvents, such as trioctylphosphine oxide (TOPO), hexadecylamine (HDA), oleylamine, or non-coordinating solvents such as 1-octadecene (ODE). Hydrothermal synthesis is carried out in an aqueous medium and the precursor injection is generally performed at room temperature. The mixture is then refluxed (100° C.) or heated to temperatures greater than 150° C. in an autoclave. The synthesis most currently used to manufacture quantum dots, and which enables to achieve the highest light outputs, is the metal-organic-type method. However, this method generate hydrophobic particles which are only miscible with apolar-type organic solvents (toluene, chloroform, hexane, etc). Unfortunately, most of these solvents are toxic for man and the environment. To make the particles miscible with other polar-type solvents (which are little or non-toxic), a ligand exchange is necessary. It should be noted that the surface ligand exchange is very often accompanied by a decrease in the photoluminescence quantum efficiency of the quantum dots. Similarly, the hydrophobic ligands resulting from the synthesis of the quantum dots (by a metal-organic method) are not compatible with all type of encapsulants used to shape the particles, for example, silicone resins. When the hydrophobic quantum dots are mixed with a silicone resin, a strong particle aggregation and flocculation can be observed. Further, quantum dots generally suffer from a poor stability over time due to the oxidation of the surface metals, which results in a significant decrease of the light output over time. It is thus desirable to develop a versatile method of surface treatment of quantum dots, which enables both to protect the quantum dots against oxidation and to provide them with specific surface functions which enable to make then miscible with their dispersing medium (encapsulant, solvent, ligand, composition containing resins, etc.) according to the desired application and shaping, without for this to result in a loss of light output of the original particles (before the surface treatment).

In the case where the nanoparticle is a quantum dot, other specific coupling agents, other than organosilanes, may be used. According to an embodiment, these specific coupling agents may have at least two thiol-type functions (—SH). The following coupling agents may be used: 1,6-hexanedithiol (which has two thiol functions), trimethylol-propane tris(3-mercaptopropionate) (which has three thiol functions), and pentaerythritol tetrakis(3-mercaptopropionate) (which has four thiol functions). At least one of the thiol functions reacts at the surface of nanoparticles while the remaining thiol functions are directed towards the outside of the particle and may react with specific monomers to form an organic layer around the quantum dot. According to an embodiment, the specific monomers should have at least two acrylic functions ($CH_2=CHCOO$—) and may for example be: poly(ethylene glycol) diacrylate (which has two acrylic functions), pentaerythritol triacrylate (which has three acrylic functions), pentaerythritol tetraacrylate (which has four acrylic functions). The coupling between the thiol functions and the acrylic functions is performed by addition reaction and results in an organic ligand chain surrounding the nanoparticle and terminated by acrylate functions. The addition reaction may be catalyzed by amines or by a radical initiator.

Figure 9:
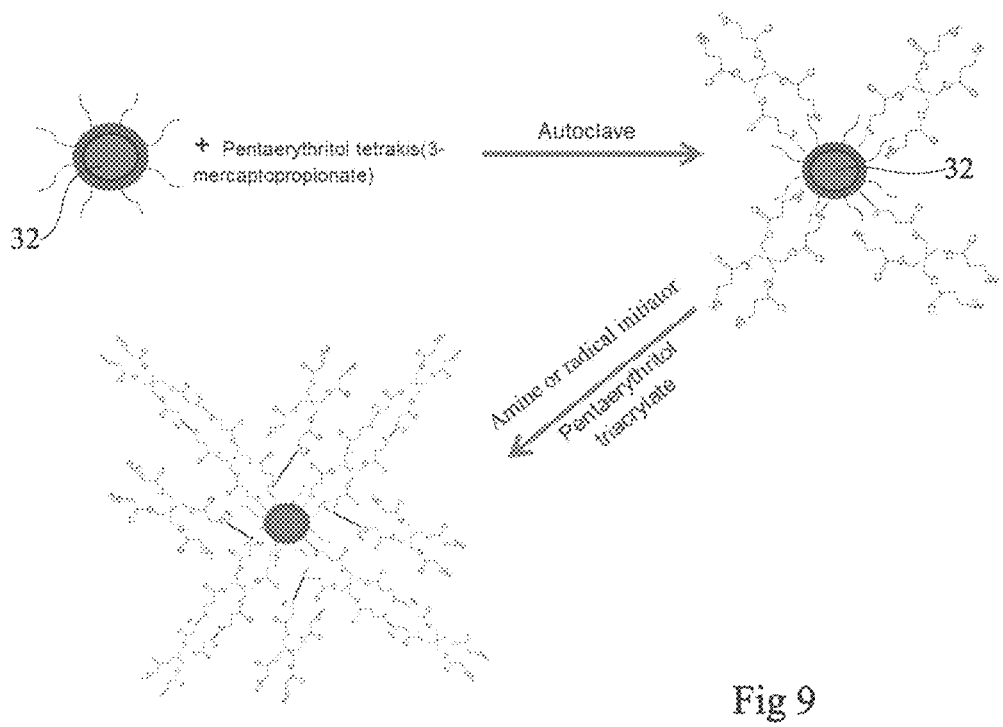
FIG. 9 schematically shows a nanoparticle at the steps of an embodiment of the method illustrated in FIG. 1.

FIG. 9 illustrates this embodiment in the case where pentaerythritol tetrakis(3-mercaptopropionate) is used as a specific ligand and pentaerythritol tetraacrylate is used as a specific monomer. The acrylate functions generated on the nanoparticle surface may then be used as a crosslinking base to encapsulate the quantum dots in a polymer, for example PMMA, or a resin, for example, silicone, or a resist.

A resist may be of epoxy, acrylate, silicone, or the like type, preferably of acrylate type. According to an embodiment, the acrylate resist comprises at least the 5 following components:
at least one acrylic-type basic monomer or oligomers, which forms the base of the resist:
a binder to improve the mechanical properties of the resist and ease the development of the resist after illumination:
a photoinitiator to initiate the resist crosslinking reactions;
at least a single type of scattering particles to improve the light extraction efficiency of the quantum dots/resist layer;
at least one solvent to place the mixture in a solution. The solvent also enables to adjust the viscosity of the mixture and to adapt it to the specifications of the shaping method.

The acrylic-type basic monomer or oligomer may be selected from the group comprising Polyethyleneglycol diacrylate, Tripropyleneglycol diacrylate, 3 methyl-1.5-pentanediol di-acrylate, Dipropyleneglycol diacrylate, Hexanediol diacrylate, Trimethylolpropane triacrylate. Trimethylolpropane, triacrylate, Trimethylolpropane triacrylate, Pentaerythritol tri and tetraacrylate, Ditrimethylolpropane tetra-acrylate, Dipenta-erythritol hexaacrylate, and Dipentaerythritol hexaacrylate.

The binder may be a polymer or copolymer having a molecular weight in the range from 1,000 and 40,000 g/mol, preferably from 2.000 and 20,000 g/mol. The binder should have an acid value at least equal to 100 mg of KOH/g of binder to allow a better extraction of the resist during the development after the illumination and also a better bonding of the resist to the target substrate. The composition of the binder should also take into account the chemical nature of the quantum dots and of scattering particles to provide a better compatibility thereof with the photosensitive composition. A binding copolymer may for example comprise a monomer terminated by an acid function, such as acrylic acid, an acrylate monomer terminated by an alcohol function such as 2-hydroxyethylmethacrylate, and an acrylate monomer terminated by an aromatic function such as benzyl methacrylate. Monomers terminated by vinyl functions or unsaturated polymers such as styrene, methyl vinyl ether, 4-methyl styrene, may also be added to the binder.

The scattering particles may be $SiO_2$, $Al_2O_3$, $TiO_2$, $ZrO_2$, ZnO, or $BaSO_4$ particles. The scattering particle diameter may range from 0.005 μm to 10 μm, preferably from 0.05 μm to 1 μm.

A wide range of solvents (or solvent mixture) may be used. The solvents may be of polar or apolar type according to the type of the surface groups of the quantum dots, to the scattering particles, and to the compatibility with the binder, the resist, etc.

The quantum dots/photosensitive composition mixture may be applied to the substrate by different deposition methods, for example, spin coating, dip coating, sputtering, or laminar coating.

Examples have been carried out by the inventors. For the examples comprising a milling step, such as step $10_2$ previously described in relation with FIG. 8, the milling step has been carried out by using a suspension of photoluminescent particles. The suspension has been formed by mixing 10 g of photoluminescent particles in 45 ml of ethanol and 240 g of $ZrO_2$ balls having a 0.5-mm diameter. The suspended particles have been milled for 30 minutes and the rotation speed of the mill was 1,800 revolutions/min.

For the examples comprising a nanoparticle functionalization step, such as step 14 previously described in relation with FIG. 1, the functionalized nanoparticles have been precipitated by addition of acetonitrile in excess. The solid phase has been recovered by centrifugation, and has then been dried between 25° C. and 80° C. for 12 hours to form a nanoparticle powder.

Measurements of internal quantum efficiency $QY_{int}$, of absorption coefficient Abs, and of external quantum efficiency $QY_{ext}$ have been carried out for the manufactured photo-luminescent powders and photoluminescent particle dispersions. Internal quantum efficiency $QY_{int}$, absorption coefficient Abs, and external quantum efficiency $QY_{ext}$ are defined by the following relations (4):

$QY_{int}=N_{em}/N_{abs}$ $Abs=N_{abs}/N_{exc}$ $$QY_{ext}=QY_{int}*Abs \qquad (4)$$

where $N_{em}$ and $N_{abs}$ respectively are the number of photons emitted and absorbed by the photoluminescent material, $N_{exc}$ is the total number of photons emitted by the excitation source. Values $QY_{int}$ and Abs are directly provided by the measurement device. External quantum efficiency $QY_{ext}$ can thus be deduced from these values.

The measurements of internal quantum efficiency $QY_{int}$ and of absorption coefficient Abs have been performed by using a Hamamatsu CG-2 spectrometer (250-900 nm) equipped with an integration sphere. The values of external quantum efficiency $QY_{ext}$ are provided with a 5% error margin.

In examples 1 to 6, YAG:Ce$^{3+}$ photoluminescent particles have been manufactured. Such particles are capable of emitting yellow light when they are excited by blue light.

Comparison Example 1

The YAG:Ce$^{3+}$ microparticle powder commercialized by FREE RADICAL TECHNOLOGY CO., LTD (Taiwan) under reference PF-Y46W200 has been used as a comparison powder.

The microparticles are obtained by synthesis by solid-state reaction. In example 1, there has been no milling step and no step of functionalization by a coupling agent.

Figure 10:
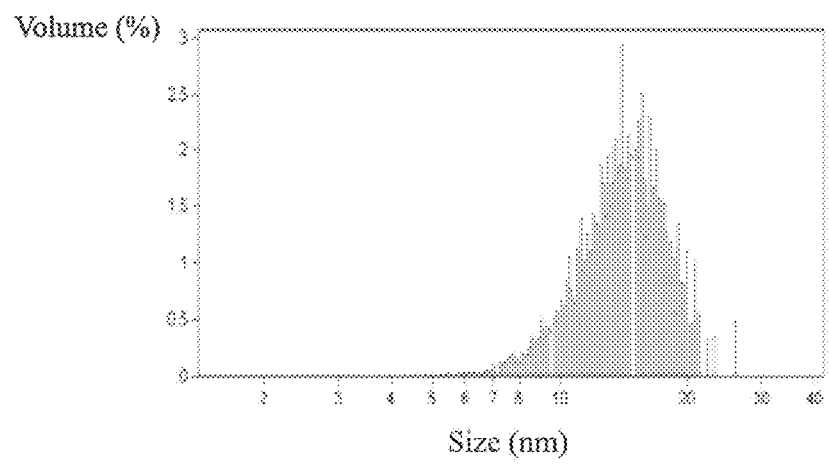
FIGS. 10 to 12 are particle size distribution curves of photoluminescent particles.

FIG. 10 shows the particle size curve of the YAG:Ce$^{3+}$ microparticle powder. The $d_{50}$ was 14 µm, the $d_{90}$ was 20 µm, and the $d_{10}$ was 8 µm. The maximum of the emission band is located at 558 nm.

Internal quantum efficiency $QY_{int}$, absorption coefficient Abs, and external quantum efficiency $QY_{ext}$ have been measured. The obtained results are gathered in Table (I) hereafter:

TABLE I

| $QY_{int}$ (%) | Abs | $QY_{ext}$ (%) |
|---|---|---|
| 95 | 0.91 | 87 |

Comparison Example 2

The YAG:Ce$^{3+}$ microparticle powder of example 1 has been used to form a nanoparticle powder.

A milling step has been carried out. No step of functionalization by a coupling agent has been carried out.

Figure 11:
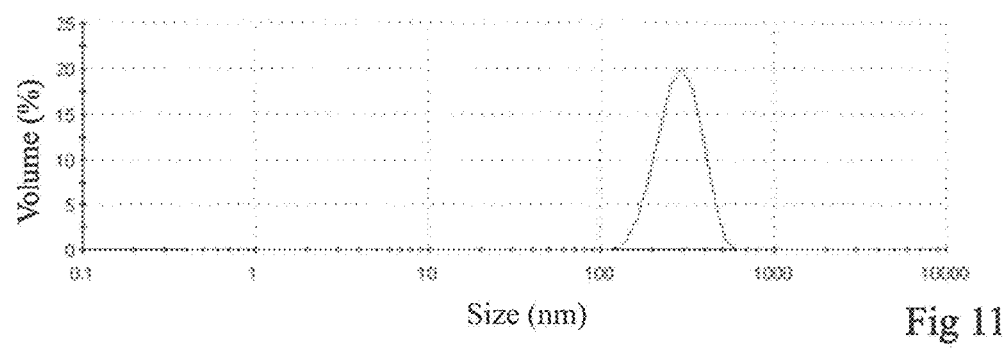

FIG. 11 shows the particle size curve of the YAG:Ce$^{3+}$ nanoparticle powder obtained after milling.

Internal quantum efficiency $QY_{int}$, absorption coefficient Abs, and external quantum efficiency $QY_{ext}$ have been measured. The obtained results are gathered in Table (11) hereafter:

TABLE II

| $QY_{int}$ (%) | Abs | $QY_{ext}$ (%) |
|---|---|---|
| 68 | 0.8 | 54 |

External quantum efficiency $QY_{ext}$ of the nanoparticle powder obtained by milling of the powder of example 1 with no functionalization step is lower by more than 33 points than the quantum efficiency of the powder of example 1.

Comparison Example 3

A powder of YAG:Ce$^{3+}$ nanoparticles has been manufactured by a solvothermal method.

A colloidal dispersion has been formed by mixing 56.16 mmol of hydrated yttrium acetate, 0.05 mmol of hydrated cerium acetate (III), and 94.55 mmol of aluminum isopropoxide in a mixture of solvents comprising 450 ml of 1,4-butanediol, and 60 ml of diethylene glycol. The mixture has been heated in an autoclave at 300° C. for 1 hour. The obtained colloidal dispersion has been cooled down to the room temperature. The nanoparticles have been precipitated by addition of acetonitrile in excess. The solid phase has been recovered by centrifugation, and has then been dried at 80° C. for 12 hours to form a nanoparticle powder. The nanoparticle powder has been annealed for 4 hours at 1,500° C. Before the anneal, the average nanoparticle size was 40 nm. After the anneal, the average nanoparticle size was in the range from 100 nm to 900 nm.

Internal quantum efficiency $QY_{int}$, absorption coefficient Abs, and external quantum efficiency $QY_{ext}$ have been measured. The obtained results are gathered in Table (III) hereafter:

TABLE III

| $QY_{int}$ (%) | Abs | $QY_{ext}$ (%) |
|---|---|---|
| 49 | 0.71 | 35 |

Example 4

The YAG:Ce$^{3+}$ microparticle powder of example 1 has been used to form a nanoparticle powder.

A milling step has been carried out. A functionalization step has been carried out. For the functionalization step, the solvent was ethanol and the coupling agent was trimethoxyoctadecylsilane (TMODS, Sigma Aldrich). The nanoparticle concentration has been adjusted to 35 mg/ml of ethanol. The mass ratio between the nanoparticles and the coupling agent was 1:1. The dispersion has been placed in an autoclave for 17 hours at 150° C. at a pressure from 20 bars to 30 bars.

The nanoparticle powder has been recovered after the step of functionalization by the addition of ethanol (antisolvent) in excess. The addition of ethanol causes a very fast decantation of the particles. This is a proof that the particle surface has become hydrophobic after the treatment in the autoclave in the presence of TMODS. A dispersion of the powder of functionalized nanoparticles has been achieved in 1,2-dichlorobenzene, which is a non-polar solvent.

Figure 12:
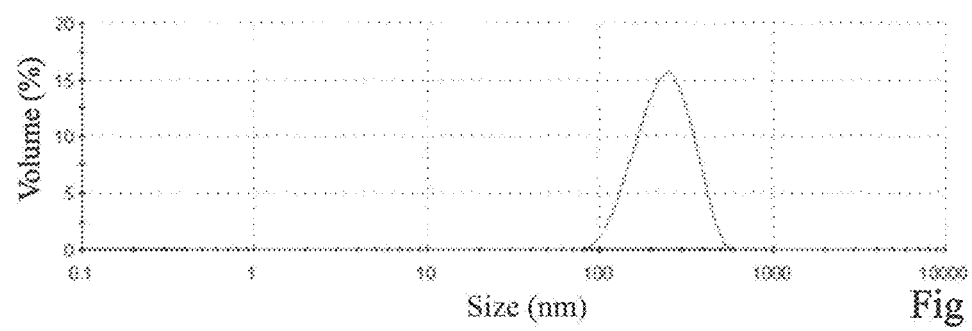

FIG. 12 shows the particle size curve of the YAG:Ce$^{3+}$ nanoparticle dispersion in 1,2-dichlorobenzene. The functionalized nanoparticles are substantially stable in the solvent after several weeks at room temperature.

Internal quantum efficiency QY$_{int}$, absorption coefficient Abs, and external quantum efficiency QY$_{ext}$ have been measured. The obtained results are gathered in Table (IV) hereafter:

TABLE IV

| QY$_{int}$ (%) | Abs | QY$_{ext}$ (%) |
|---|---|---|
| 77 | 0.9 | 70 |

External quantum efficiency QY$_{ext}$ of the nanoparticle powder obtained at example 4 is increased with respect to external quantum efficiency QY$_{ext}$ of the nanoparticle powder obtained at examples 2 and 3.

Figure 13:
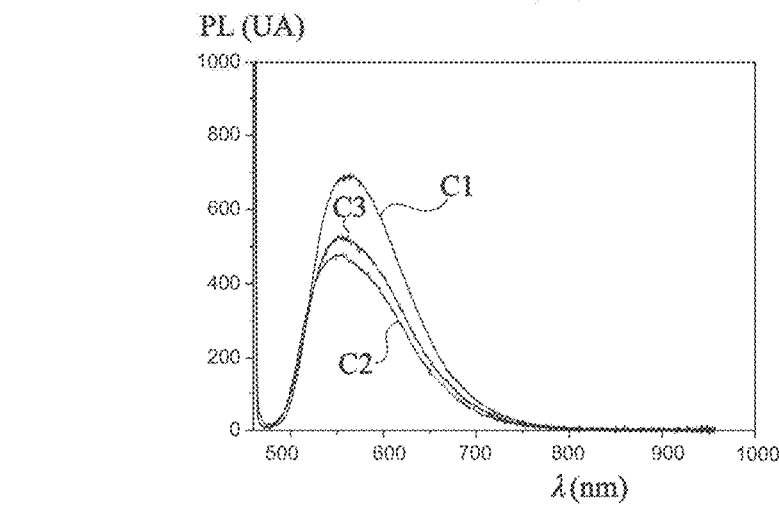
FIG. 13 shows curves of the variation of the photoluminescence intensity according to the wavelength of the radiation emitted by photoluminescent materials.

FIG. 13 shows curves C1, C2, and C3 of the variation of photoluminescence intensity PL, in arbitrary units, according to wavelength n, in nanometers, of the radiation PL emitted by photoluminescent powders respectively manufactured at examples 1, 2, and 4 receiving a light radiation having a 460-nm wavelength. The functionalization step enables to increase the photoluminescence intensity of the nanoparticle powder obtained after the milling step.

Figure 14:
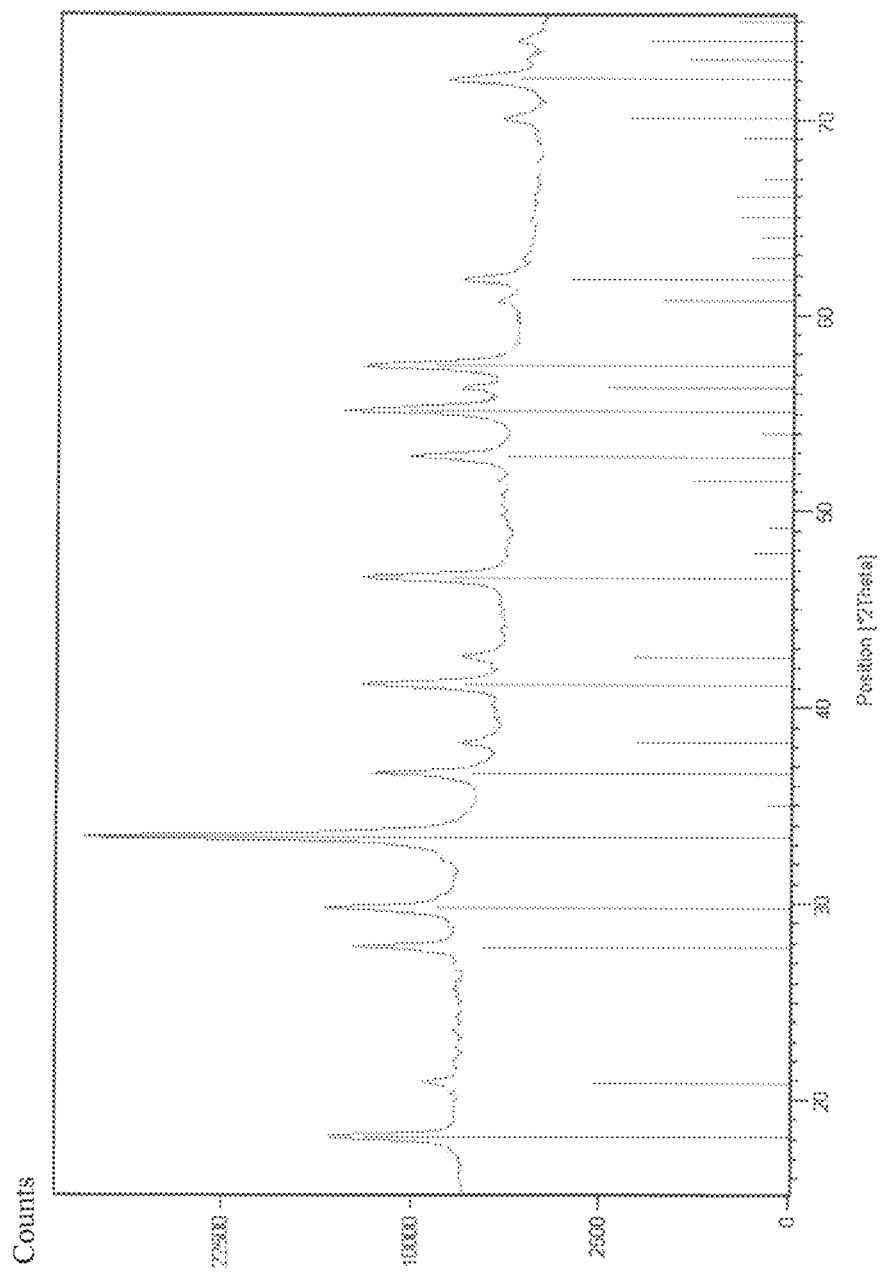
FIG. 14 is an X-ray diffractogram representative of an example of photoluminescent nanoparticles.

FIG. 14 shows the result of an X-ray diffraction analysis performed on the photoluminescent nanoparticle powder dried in air for 12 hrs. The result shows that all the observed diffraction peaks correspond to the crystallized phase of Y$_3$Al$_5$O$_{12}$. No impurity or parasitic phase can be observed. The widening of the diffraction peaks confirms that the crystallites have a nanometer-range diameter as has also been measured by dynamic scattering of the light and by electronic transmission microscopy.

Example 5

The YAG:Ce$^{3+}$ microparticle powder of example 1 has been used to form a nanoparticle powder.

A milling step has been carried out. A functionalization step has been carried out. For the functionalization step, the solvent was ethanol and the coupling agent was (3-glycidoxypropyl)trimethoxysilane (GPTMS, Sigma Aldrich). The nanoparticle concentration has been adjusted to 50 mg/ml of ethanol. The mass ratio between the nanoparticles and the coupling agent was 1:1. The dispersion has been placed in an autoclave for 25 hours at 150° C. and at a pressure from 20 bars to 30 bars.

The nanoparticle powder has been recovered after the functionalization step by centrifugation. A dispersion of the powder of functionalized nanoparticles has been achieved in diethylene glycol diethyl ether, which is a polar solvent.

Figure 15:
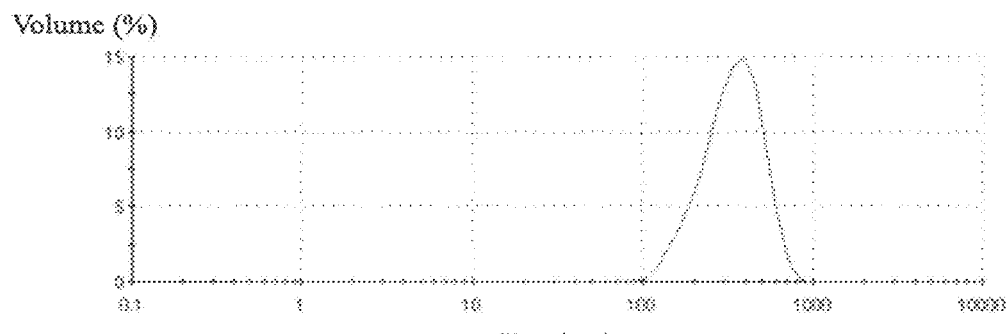
FIGS. 15 to 18 are particle size curves of photoluminescent particle powders.

FIG. 15 shows the particle size curve of the YAG:Ce$^{3+}$ nanoparticle powder obtained after the functionalization step. This curve is close to the curve of FIG. 11.

Internal quantum efficiency QY$_{int}$, absorption coefficient Abs, and external quantum efficiency QY$_{ext}$ have been measured. The obtained results are gathered in Table (V) hereafter:

TABLE V

| QY$_{int}$ (%) | Abs | QY$_{ext}$ (%) |
|---|---|---|
| 75 | 0.8 | 60 |

External quantum efficiency QY$_{ext}$ of the nanoparticle powder obtained at example 5 is increased with respect to external quantum efficiency QY$_{ext}$ of the nanoparticle powder obtained at examples 2 and 3.

Example 6

The YAG:Ce$^{3+}$ microparticle powder of example 1 has been used to form a nanoparticle powder.

A milling step has been carried out. A pretreatment step has been carried out, where the nanoparticle dispersion obtained at the milling step has been mixed with TEOS and with an aqueous solution with 30% of ammonia (NH$_4$OH). The mixture is then heated at 70° C. for 7 hours. The photoluminescent nanoparticle concentration has been adjusted to 18 mg/ml. The volume ratio between the ammonia solution and the TEOS was 0.5 ml of TEOS/0.4 ml of NH$_4$OH. The SiO$_2$ mass after a full hydrolysis/condensation of TEOS amounts to approximately 5% of the photoluminescent nanoparticle mass. A functionalization step has then been carried out. For the functionalization step, the solvent was ethanol and the coupling agent was (3-trimethoxysilyl) propyl methacrylate (TMSPMA, Sigma Aldrich). The photoluminescent nanoparticle concentration has been adjusted to 30 mg/ml of ethanol. The mass ratio between the nanoparticles and the coupling agent was 1:0.5. The dispersion has been placed in an autoclave for 17 hours at 150° C. and at a pressure in the range from 20 bars to 30 bars.

The nanoparticle powder has been recovered after the functionalization step. A dispersion of the powder of functionalized nanoparticles has been achieved in tetrahydrofuran (THF), which is a polar solvent. The photoluminescent nanoparticle dispersion remains stable (no decantation) over time.

Figure 16:
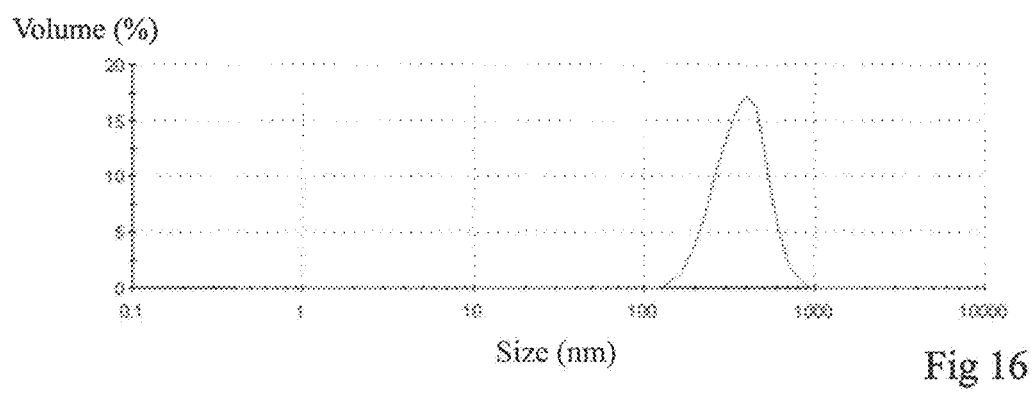

FIG. 16 shows the particle size curve of the YAG:Ce$^{3+}$ nanoparticle powder obtained after the functionalization step. This curve is close to the curve of FIG. 11.

Internal quantum efficiency QY$_{int}$, absorption coefficient Abs, and external quantum efficiency QY$_{ext}$ have been measured. The obtained results are gathered in Table (VI) hereafter:

TABLE VI

| QY$_{int}$ (%) | Abs | QY$_{ext}$ (%) |
|---|---|---|
| 75 | 0.9 | 67.5 |

External quantum efficiency QY$_{ext}$ of the nanoparticle powder obtained at example 6 is increased with respect to external quantum efficiency QY$_{ext}$ of the nanoparticle powder obtained at examples 2 and 3.

In the following examples 7 to 10, Lu$_3$Al$_5$O$_{12}$:Ce$^{3+}$ (LuAG:Ce) photoluminescent particles have been manufactured. Such particles are capable of emitting green light when they are excited by blue light.

Comparison Example 7

The LuAG:Ce$^{3+}$ microparticle powder commercialized by FREE RADICAL TECHNOLOGY CO., LTD (Taiwan) under reference PF-X16W200 has been used as a comparison powder.

The microparticles are obtained by solid-state reaction synthesis. In example 7, there has been no milling step and no step of functionalization by a coupling agent.

Figure 17:
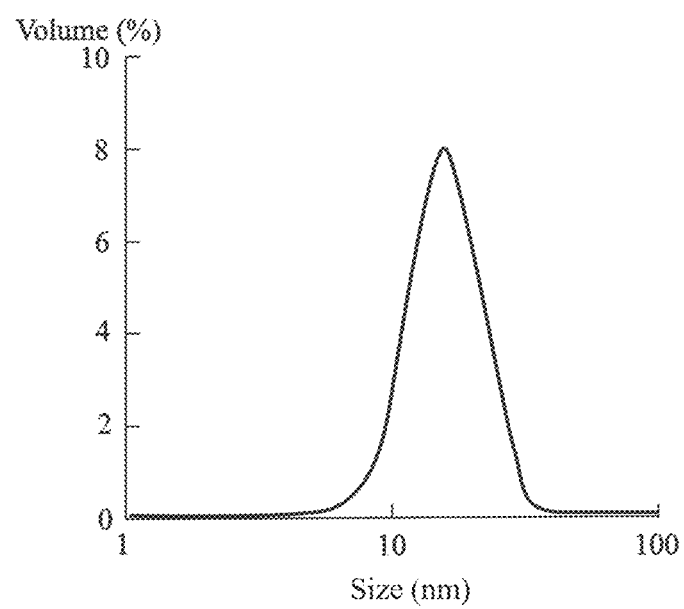

FIG. 17 shows the particle size curve of the LuAG:Ce$^{3+}$ microparticle powder. The $d_{50}$ was 15 μm. The maximum of the emission peak has been obtained for a 534-mm wavelength.

Internal quantum efficiency $QY_{int}$, absorption coefficient Abs, and external quantum efficiency $QY_{ext}$ have been measured. The obtained results are gathered in Table (VII) hereafter.

TABLE VII

| $QY_{int}$ (%) | Abs | $QY_{ext}$ (%) |
|---|---|---|
| 95 | 0.88 | 84 |

Comparison Example 8

The LuAG:Ce$^{3+}$ microparticle powder of example 7 has been used to form a nanoparticle powder.

A milling step has been carried out. No step of functionalization by a coupling agent has been carried out.

Internal quantum efficiency $QY_{int}$, absorption coefficient Abs, and external quantum efficiency $QY_{ext}$ have been measured. The obtained results are gathered in Table (VIII) hereafter.

TABLE VIII

| $QY_{int}$ (%) | Abs | $QY_{ext}$ (%) |
|---|---|---|
| 78.1 | 0.702 | 54 |

External quantum efficiency $QY_{ext}$ of the nanoparticle powder obtained by milling of the powder of example 8 with no functionalization step is lower by more than 30 points than the quantum efficiency of the powder of example 7.

Example 9

The LuYAG:Ce$^{3+}$ microparticle powder of example 7 has been used to form a nanoparticle powder.

A milling step has been carried out. A functionalization step has been carried out. For the functionalization step, the solvent was ethanol and the coupling agent was trimethoxyoctadecylsilane. The photoluminescent nanoparticle concentration has been adjusted to 25 mg/ml of ethanol. The mass ratio of the nanoparticles to the coupling agent was 1:1. The dispersion has been placed in an autoclave for 20 hours at 150° C. and at a pressure in the range from 20 bars to 30 bars.

The nanoparticle powder has been recovered after the functionalization step. A dispersion of the functionalized nanoparticle powder has been performed in 1,2-dichlorobenzene.

Figure 18:
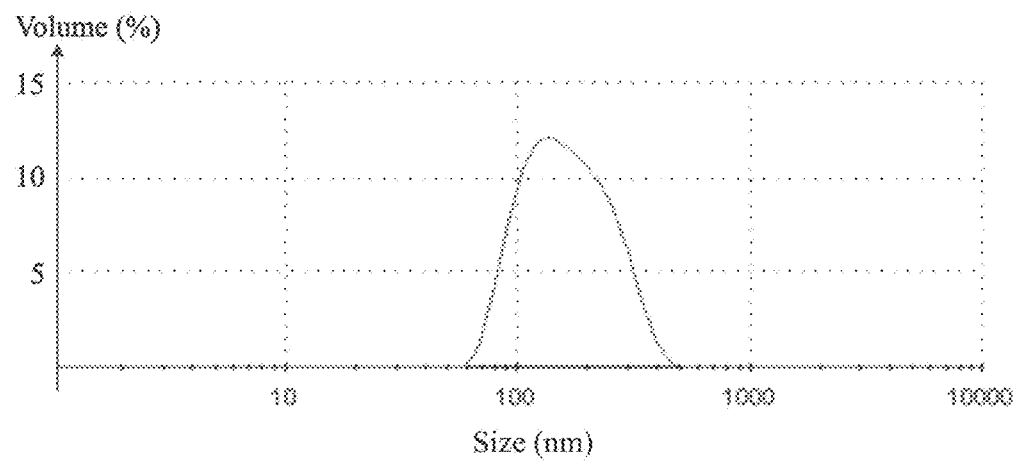

FIG. 18 shows the particle size curve of the LuAG:Ce$^{3+}$ nanoparticle dispersion in 1,2-dichlorobenzene obtained after the functionalization step.

Internal quantum efficiency $QY_{int}$, absorption coefficient Abs, and external quantum efficiency $QY_{ext}$ have been measured. The obtained results are gathered in Table (IX) hereafter.

TABLE IX

| $QY_{int}$ (%) | Abs | $QY_{ext}$ (%) |
|---|---|---|
| 76.4 | 0.824 | 63 |

External quantum efficiency $QY_{ext}$ of the nanoparticle powder obtained at example 10 is increased with respect to external quantum efficiency $QY_{ext}$ of the nanoparticle powder obtained at example 8.

Figure 19:
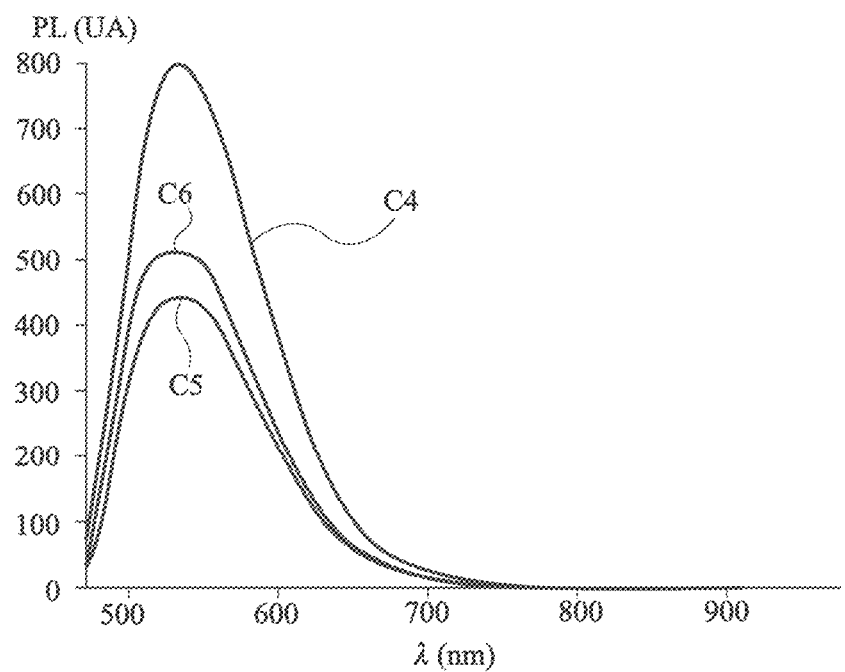
FIG. 19 shows curves of the variation of the photoluminescence intensity according to the wavelength of the radiation emitted by photoluminescent materials.

FIG. 19 shows curves C4, C5, and C6 of variation of the photoluminescence intensity PL, in arbitrary units, according to wavelength λ, in nanometers, corresponding to the photoluminescent particles of examples 7, 8, and 9 under a 460-nm excitation. The functionalization step enables to increase the photoluminescence intensity of the nanoparticle powder obtained after the milling step.

Example 10

First, YAG:Ce nanoparticles have been treated by TEOS/NH$_4$OH and functionalized by the trimethoxy(7-octen-1-yl) silane (Sigma Aldrich) coupling agent according to the same operating mode as that used in example 6. After washing and purification, the photoluminescent nanoparticles have been dispersed again in 1,2 dichlorobenzene at a 50-mg/ml concentration. Then, 30 ml of the nanoparticle solution have been mixed with 0.1 g of methylhydro-dimethylsiloxane polymer terminated by a trimethylsilyl function (silicon hydride, PS123, United Chemical Technologies) and 0.02 g of a solution containing 0.1 wt. % of platinum divinyltetramethylsiloxane (SiP6830.3, Gelest Inc.). This mixture is heated at approximately 50° C. for 10 min. Then, 0.5 g of polydimethylsiloxane (PDMS) terminated by a dimethylvinyl function (PS443, United Chemical Technologies) have been added to the first mixture and the final solution is heated at 70° C. for from 10 min to 15 min. The final particle dispersion is stable at ambient temperature and may be used for the deposition of nanoparticles by inkjet printing. A homogeneous composite film has been formed from the final solution by spin coating on a glass plate. The film is then heated at 90° C. to remove the solvent and crosslink the silicone resin. The mass percentage of photoluminescent nanoparticles with respect to the silicone resin in this example is equal to approximately 70%.

Example 11

The photoluminescent nanoparticle dispersion prepared at example 6 has been used. The photoluminescent nanoparticle concentration has been adjusted to 20 mg/ml of THF. 50 ml of the photoluminescent nanoparticle solution are mixed with 0.9 ml of methyl methacrylate (MMA, Sigma Aldrich) under a magnetic stirring. In parallel, a solution of 2,2'-azobis(2-methylpropio-nitrile) (AIBN), a radical polymerization initiator, (Sigma Aldrich) has been prepared by the dissolution of 50 mg of AIBN in 5 ml of THF. The AIBN solution has been added to the mixture containing the photoluminescent nanoparticles and the final mixture is heated at 70° C. for 4 hrs. A dispersion of photoluminescent nanoparticles/PMMA is obtained and may be used for the deposition of photoluminescent particles, for example by inkjet printing. The mass percentage of photoluminescent nanoparticles relative to the PMMA is equal to approximately 60%.

In examples 12 to 14, $(La,Y)_3Si_6N_{11}$:Ce photoluminescent particles have been manufactured. Such particles are capable of emitting yellow light when they are excited by blue light.

Comparison Example 12

The powder of $(La,Y)_3Si_6N_{11}$:Ce microparticles commercialized by Mitsubishi Chemical Corporation (Japan) under reference BY-202/A has been used as a comparison powder. These microparticles are obtained by solid-state reaction synthesis. In example 12, there has been no milling step and no step of functionalization by a surface agent.

Figure 20:
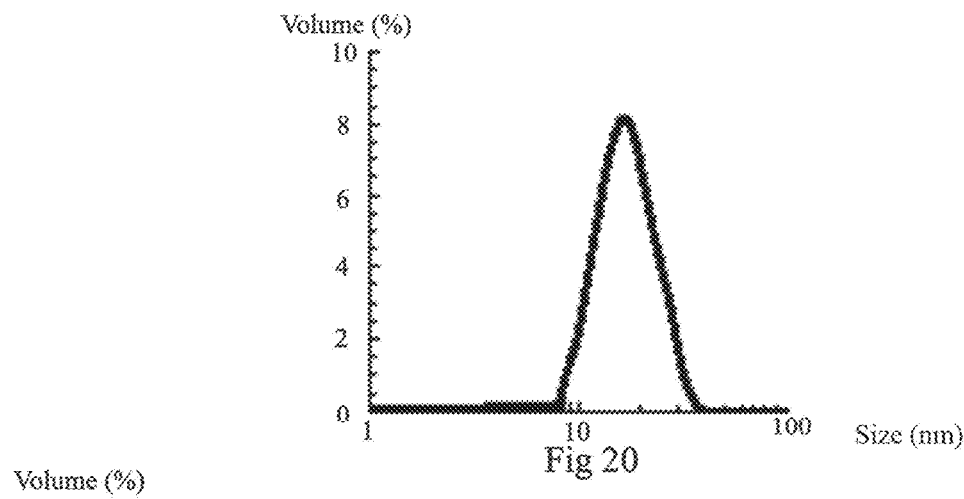
FIGS. 20, 21 and 22 are figures similar to respectively FIGS. 17, 18 and 19 for another photoluminescent material.

FIG. 20 shows the particle size curve of the microparticle powder, the d50 being 15 μm. The maximum of the emission band is at 547 nm.

Internal quantum efficiency $QY_{int}$, absorption coefficient Abs, and external quantum efficiency $QY_{ext}$ have been measured. The obtained results are gathered in Table (X) hereafter.

TABLE X

| $QY_{int}$ (%) | Abs | $QY_{ext}$ (%) |
|---|---|---|
| 80 | 0.9 | 72 |

Comparison Example 13

The $(La,Y)_3Si_6N_{11}$:Ce microparticle powder of example 12 has been used to form a nanoparticle powder. A milling step has been carried out. No step of functionalization by a surface agent has been carried out.

Internal quantum efficiency $QY_{int}$, absorption coefficient Abs, and external quantum efficiency $QY_{ext}$ have been measured. The obtained results are gathered in Table (XI) hereafter.

TABLE XI

| $QY_{int}$ (%) | Abs | $QY_{ext}$ (%) |
|---|---|---|
| 55 | 0.7 | 38.5 |

External quantum efficiency $QY_{ext}$ of the nanoparticle powder obtained by milling of the powder of example 12 with no surface modification step is lower by more than 33 points than the quantum efficiency of the powder of example 12.

Example 14

The $(La,Y)_3Si_6N_{11}$:Ce microparticle powder of example 12 has been used to form a nanoparticle powder.

A milling step has been carried out. A functionalization step has been carried out. It is known in the state of the art that materials based on silicon nitride have surface properties close to those of silicate materials. The surface of nanometer-range $(La,Y)_3Si_6N_{11}$:Ce particles can thus have Si—OH groups which may be used to graft silane-type coupling agents, for example. For the functionalization step, the solvent was ethanol and the coupling agent was 2-[Methoxy(Polyethyleneoxy)6-9Propryl]Trimethoxysilane commercialized under reference SiM6492.7 by Gelest, Inc. The nanoparticle concentration has been adjusted to 20 mg/ml of ethanol. The mass ratio between the nanoparticles and the coupling agent was 1:2.5. The dispersion has been placed in an autoclave for 17 hours at 150° C. and at a pressure from 20 bars (2 MPa) to 30 bars (3 MPa).

Figure 21:
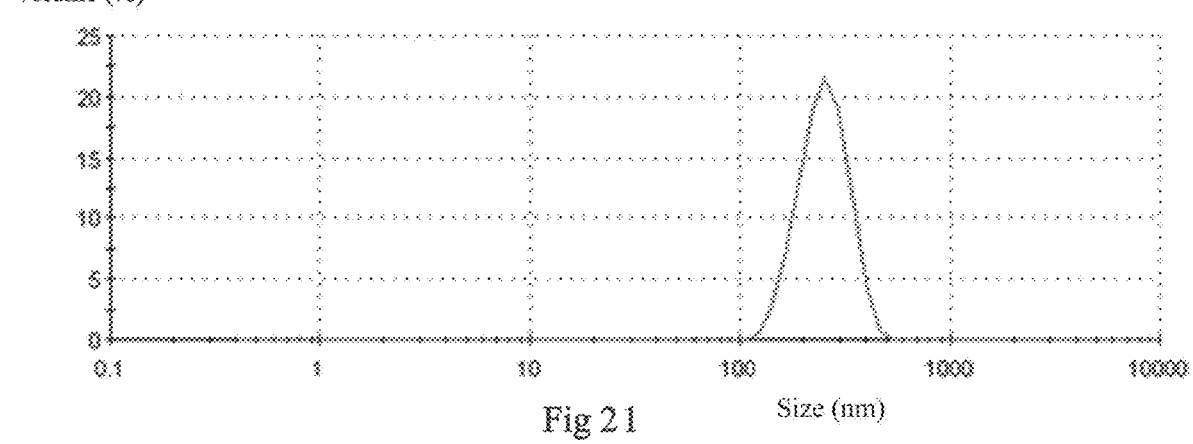

After the treatment in the autoclave, the ethanol solvent has been exchanged with the ethyl diglyme solvent. FIG. 21 shows the particle size curve of the suspension of $(La,Y)_3Si_6N_{11}$:Ce nanoparticles in the ethyl diglyme solvent. The average particle size is 256 nm. The functionalized nanoparticles are substantially stable in the solvent after several weeks at room temperature.

Internal quantum efficiency QYint, absorption coefficient Abs, and external quantum efficiency QYext of the nanometer-range $(La,Y)_3Si_6N_{11}$:Ce particles in the ethyl diglyme solvent have been measured. The obtained results are gathered in Table (XII) hereafter.

TABLE XII

| $QY_{int}$ (%) | Abs | $QY_{ext}$ (%) |
|---|---|---|
| 70 | 0.9 | 63 |

External quantum efficiency $QY_{ext}$ of the nanoparticle powder obtained at example 14 is increased with respect to external quantum efficiency $QY_{ext}$ of the nanoparticle powder obtained at example 13.

Figure 22:
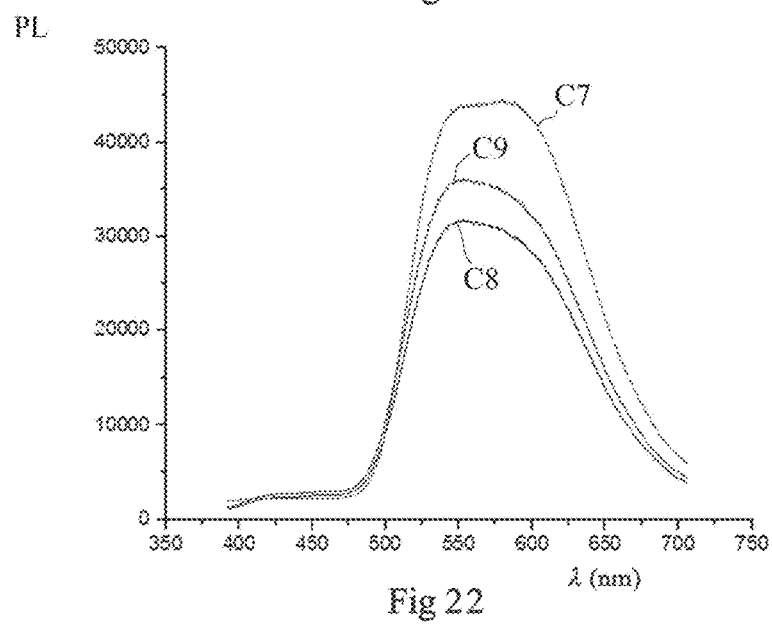

FIG. 22 shows curves C7, C8, and C9 of the variation of photoluminescence intensity PL according to wavelength λ, in nanometers, emitted by photoluminescent particles respectively manufactured at examples 12, 13, and 14 receiving a light radiation having a 460-nm wavelength. The surface modification step enables to increase the photoluminescence intensity of the nanoparticle powder obtained after the milling step.

A stable suspension of nanometer-range $(La,Y)_3Si_6N_{11}$:Ce particles in the ethyl diglyme solvent has been obtained. The particle suspension thus prepared may be mixed with an acrylate-type polymer, for example, PMMA, to form a stable phosphor ink ready for use, for example, in digital inkjet printing. Other deposition methods may also be used, particularly aerosol jet printing. The viscosity of the $(La,Y)_3Si_6N_{11}$:Ce nano-particle/PMMA mixture may be adjusted between 2 Cps (2 mPa·s) and 100 Cps (100 mPa·s), preferably between 4 Cps (4 mPa·s) and 20 Cps (20 mPa·s).

In examples 15 to 18, $CaAlSiN_3$:Eu photoluminescent particles have been manufactured. Such particles are capable of emitting red light when they are excited by blue light.

Comparison Example 15

The powder of $CaAlSiN_3$:Eu microparticles commercialized by Mitsubishi Chemical Corporation (Japan) under reference BR-101/J has been used as a comparison powder.

These microparticles are obtained by solid-state reaction synthesis. In example 15, there has been no milling step and no step of functionalization by a surface agent.

Figure 23:
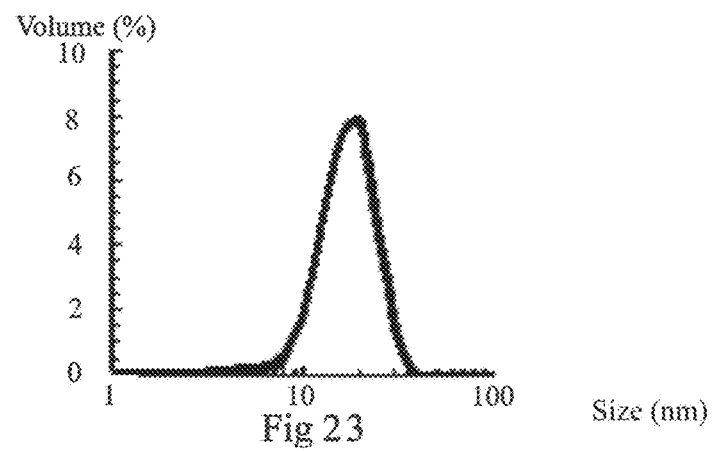
FIGS. 23, 24 and 25 are figures similar to respectively FIGS. 17, 18 and 19 for another photoluminescent material.

FIG. 23 shows the particle size curve of the microparticle powder, the d50 being 16 μm. The maximum of the emission band is at 648 nm.

Internal quantum efficiency $QY_{int}$, absorption coefficient Abs, and external quantum efficiency $QY_{ext}$ have been measured. The obtained results are gathered in Table (XIII) hereafter:

TABLE XIII

| $QY_{int}$ (%) | Abs | $QY_{ext}$ (%) |
|---|---|---|
| 92 | 0.84 | 77 |

Comparison Example 16

The $CaAlSiN_3$:Eu microparticle powder of example 15 has been used to form a nanoparticle powder. A milling step has been carried out. No step of functionalization by a coupling agent has been carried out.

Internal quantum efficiency $QY_{int}$, absorption coefficient Abs, and external quantum efficiency $QY_{ext}$ have been measured. The obtained results are gathered in Table (XIV) hereafter.

TABLE XIV

| $QY_{int}$ (%) | Abs | $QY_{ext}$ (%) |
|---|---|---|
| 50 | 0.69 | 34.5 |

External quantum efficiency $QY_{ext}$ of the nanoparticle powder obtained by milling of the powder of example 15 with no surface modification step is lower by more than 42 points than the quantum efficiency of the powder of example 15.

Example 17

The $CaAlSiN_3$:Eu microparticle powder of example 15 has been used to form a nanoparticle powder.

A milling step has been carried out. A functionalization step has been carried out. For the functionalization step, the solvent was ethanol and the coupling agent was allyltrimethoxysilane commercialized under reference SiA0540.0 by Gelest, Inc. The nanoparticle concentration has been adjusted to 15 mg/ml of ethanol. The mass ratio between the nanoparticles and the coupling agent was 1:2. The dispersion has been placed in an autoclave for 24 hours at 170° C. at a pressure from 20 bars to 30 bars.

The nanoparticle powder has been recovered after the step of functionalization by the addition of ethanol (antisolvent) in excess. The addition of ethanol causes a very fast decantation of the particles. This is a proof that the particle surface has become hydrophobic after the treatment in the autoclave in the presence of allyltrimethoxysilane. A dispersion of the functionalized nano-particle powder has been performed in 1,2-dichlorobenzene.

Figure 24:
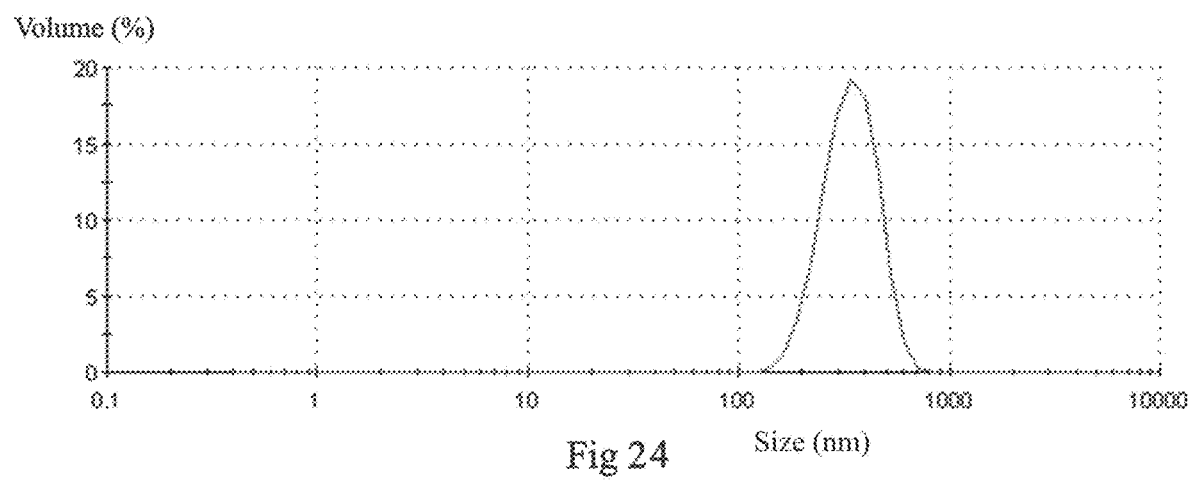

FIG. 24 shows the particle size curve of the $CaAlSiN_3$:Eu nanoparticle dispersion in the 1,2-dichloro-benzene solvent. The average particle size was 350 nm. The functionalized nanoparticles are substantially stable in the solvent after several days at room temperature.

Internal quantum efficiency QYint, absorption coefficient Abs, and external quantum efficiency QYext of the nanometer-range $CaAlSiN_3$:Eu particles in the 1,2-dichloro-benzene solvent have been measured. The obtained results are gathered in Table (XV) hereafter:

TABLE XV

| $QY_{int}$ (%) | Abs | $QY_{ext}$ (%) |
|---|---|---|
| 75 | 0.8 | 60 |

External quantum efficiency $QY_{ext}$ of the nanoparticle suspension obtained at example 17 is increased with respect to external quantum efficiency $QY_{ext}$ of the nanoparticle suspension obtained at example 16.

Figure 25:
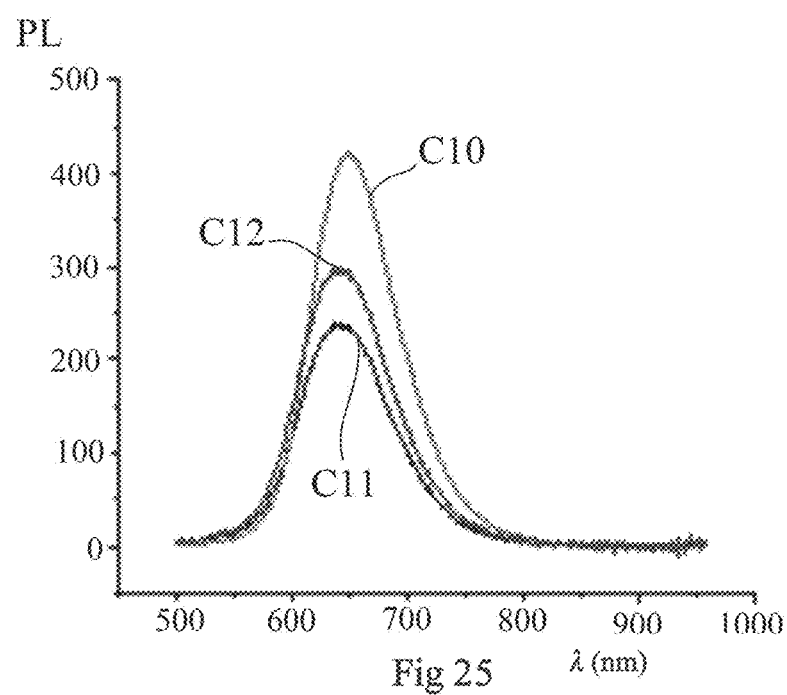

FIG. 25 shows curves C10, C11, and C12 of the variation of photoluminescence intensity PL according to wavelength λ, in nanometers, emitted by photoluminescent particles respectively manufactured at examples 15, 16, and 17 receiving a light radiation having a 460-nm wavelength. The surface modification step enables to increase the photoluminescence intensity of the nanoparticle powder obtained after the milling step.

Example 18

An ink based on $CaAlSiN_3$:Eu/silicone has been prepared. To achieve this, 2.35 g of nanometer-range $CaAlSiN_3$:Eu particles obtained in example 17 have been dispersed in 20 ml of 1,2-dichlorobenzene solvent. Then, 2.1 g of a polydimethyl siloxane (PDMS) terminated by two hydride functions, commercialized under reference DMS-H21 by Gelest, Inc, and 0.05 g of a catalyst based on Pt, commercialized under reference SiP6832.2 by Gelest, Inc, have been added to the suspension of nanometer-range $CaAlSiN_3$:Eu particles. The mixture is then heated at 90° C. for 12 hrs. After cooling, 0.25 g of PDMS terminated by two vinyl functions, commercialized under reference DMS-V31 by Gelest, Inc, have been added to the mixture, which is then heated at 90° C. for 30 min. A stable ink of silicone-based $CaAlSiN_3$:Eu phosphor is thus obtained and ready for use, for example, in inkjet printing.

In examples 19 to 21, photoluminescent $K_2SiF_6$:Mn particles have been manufactured. Such particles are capable of emitting red light when they are excited by blue light.

Comparison Example 19

The powder of $K_2SiF_6$:Mn microparticles commercialized by Mitsubishi Chemical Corporation (Japan) under reference BR-301/C has been used as a comparison powder.

These microparticles are obtained by solid-state reaction synthesis. In example 19, there has been no milling step and no step of functionalization by a surface agent.

Figure 26:
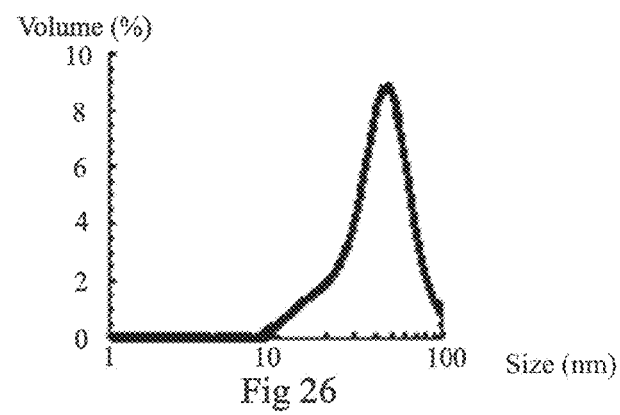
FIGS. 26, 27 and 28 are figures similar to respectively FIGS. 17, 18 and 19 for another photoluminescent material.

FIG. 26 shows the particle size curve of the microparticle powder, the d50 being 42 μm. The maximum of the emission band is at 632 nm.

Internal quantum efficiency $QY_{int}$, absorption coefficient Abs, and external quantum efficiency $QY_{ext}$ have been measured. The obtained results are gathered in Table (XVI) hereafter.

TABLE XVI

| $QY_{int}$ (%) | Abs | $QY_{ext}$ (%) |
|---|---|---|
| 91 | 0.72 | 65.5 |

Comparison Example 20

The $K_2SiF_6$:Mn microparticle powder of example 19 has been used to form a nanoparticle powder. A milling step has been carried out. No step of functionalization by a coupling agent has been carried out.

Internal quantum efficiency $QY_{int}$, absorption coefficient Abs, and external quantum efficiency $QY_{ext}$ have been measured. The obtained results are gathered in Table (XVII) hereafter.

TABLE XVII

| $QY_{int}$ (%) | Abs | $QY_{ext}$ (%) |
|---|---|---|
| 35 | 0.72 | 25 |

External quantum efficiency $QY_{ext}$ of the nanoparticle powder obtained by milling of the powder of example 20 with no surface modification step is lower by more than 40 points than the quantum efficiency of the powder of example 19.

Example 21

The $K_2SiF_6$:Mn microparticle powder of example 19 has been used to form a nanoparticle powder.

A milling step has been carried out. A functionalization step has been carried out. The functionalization step is preceded by a surface treatment aiming at repairing the defects or part of the surface defects generated by milling. Typically, 20 mg of potassium hydrogenofluoride commercialized by Sigma Aldrich and 5 mg of nanometer-range silica particles $SiO_2$ (having a 12-nm average size, commercialized by Sigma Aldrich) have been added to 200 ml of the suspension of $K_2SiF_6$:Mn nanoparticles of example 20, the $K_2SiF_6$:Mn particle concentration has been adjusted to 10 mg/ml of ethanol. The mixture is then transferred into an autoclave and heated at 170° C. for 24 hrs. Then, 140 μl of oleic acid are added to the mixture, which is then heated again in the autoclave for from 2 hrs to 110° C. at a pressure between 20 bars and 30 bars.

The nanoparticle powder has been recovered after the functionalization step by centrifugation. A dispersion of the functionalized nanoparticle powder has been performed in 1,2-dichlorobenzene.

Figure 27:
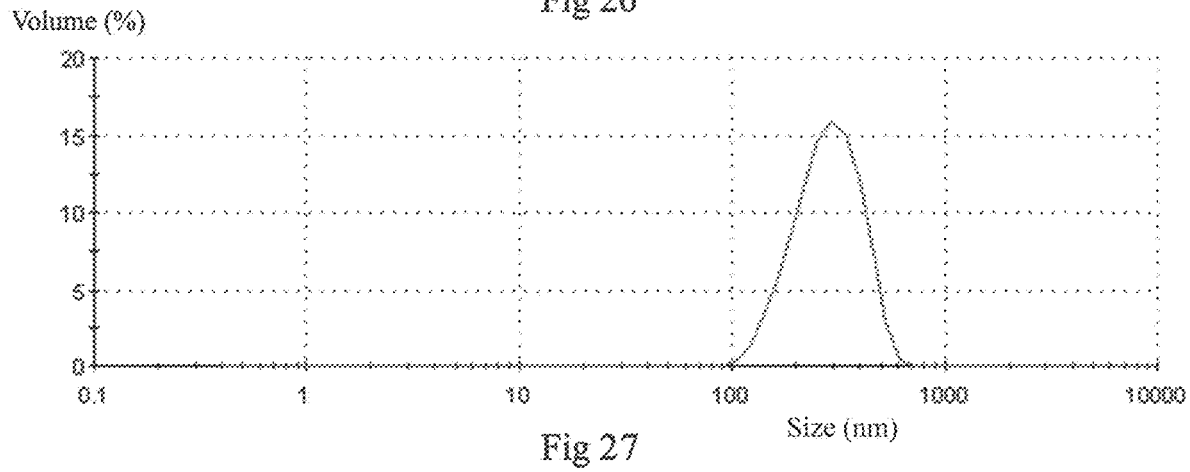

FIG. 27 shows the particle size curve of the $K_2SiF_6$:Mn nanoparticle suspension in the 1,2-dichlorobenzene solvent. The average particle size was 295 nm. The functionalized nanoparticles are substantially stable in the solvent after several days at room temperature.

Internal quantum efficiency $QY_{int}$, absorption coefficient Abs, and external quantum efficiency $QY_{ext}$ of the nanometer-range $K_2SiF_6$:Mn particles in the 1,2-dichlorobenzene solvent have been measured. The obtained results are gathered in Table (XVIII) hereafter.

TABLE XVIII

| $QY_{int}$ (%) | Abs | $QY_{ext}$ (%) |
|---|---|---|
| 73 | 0.8 | 58.4 |

External quantum efficiency $QY_{ext}$ of the nanoparticle suspension obtained at example 21 is substantially increased with respect to external quantum efficiency $QY_{ext}$ of the nanoparticle suspension obtained at example 20.

Figure 28:
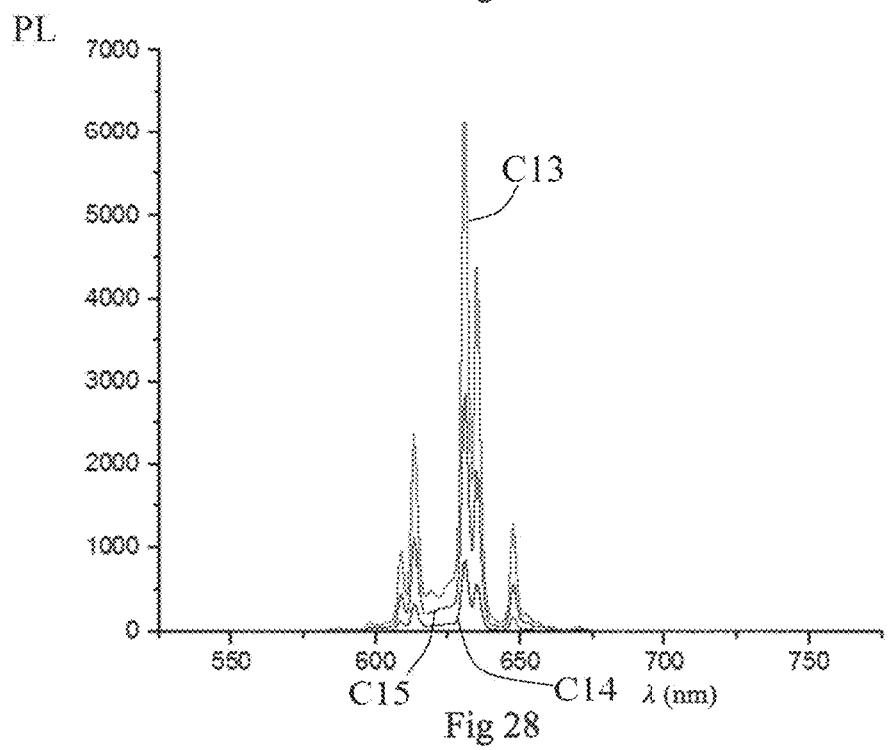

FIG. 28 shows curves C13, C14, and C15 of the variation of photoluminescence intensity PL according to wavelength λ, in nanometers, emitted by photoluminescent particles respectively manufactured at examples 1, 2, and 3 receiving a light radiation having a 460-nm wavelength. The surface modification and functionalization step enables to increase the photoluminescence intensity of the nanoparticle powder obtained after the milling step.

Example 22

A suspension of CdSe/ZnS-type quantum dots in the toluene solvent and commercialized by Najing Technology (China) has been used as a comparison solution. The quantum dots are stabilized by the oleic acid ligand.

Such semiconductor nanocrystals are obtained by synthesis by reactions in solution. In example, 22, there has been no modification of the particle surface.

Figure 29:
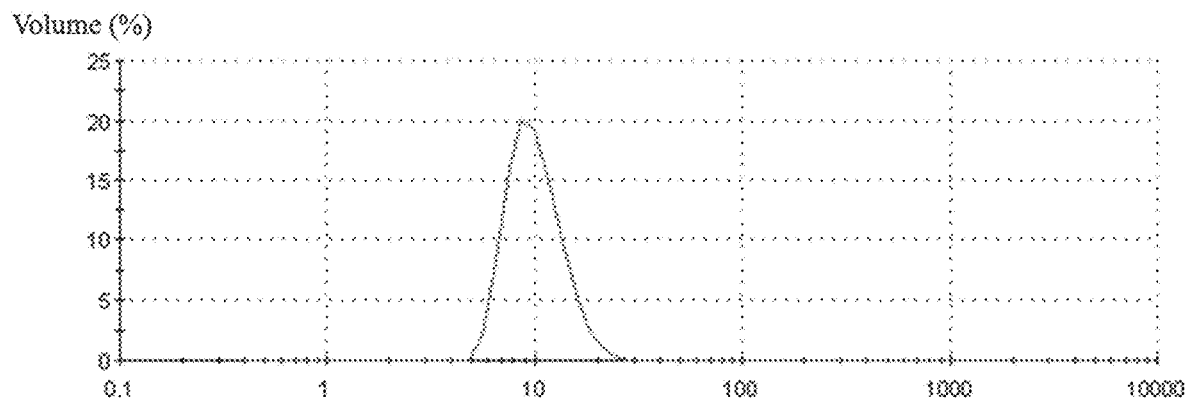
FIGS. 29 to 32 are particle size curves of photoluminescent particle powders.
Figure 30:
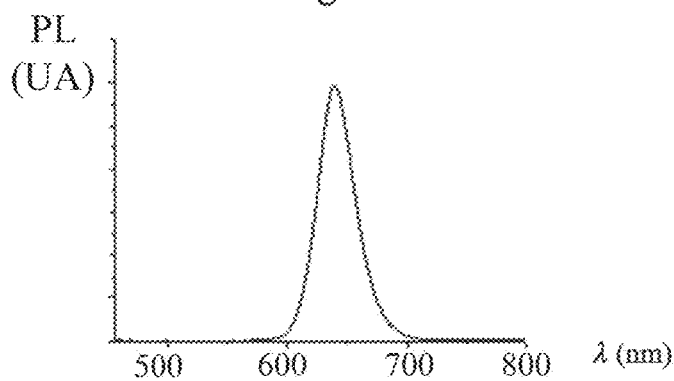

FIG. 29 shows the curve of nanocrystal size distribution in toluene. It should be specified that the measured sizes represent the hydrodynamic radius rather than the radius of the hard particle. The hydrodynamic radius effectively corresponds to the radius of the hard sphere plus a thickness of the solvation layer formed around the particle. The solvation layer contains both the ligand and the solvent. The average hydrodynamic radius was approximately 10 nm. The maximum of the emission band is at 640 nm. FIG. 30 shows the photoluminescence intensity PL, according to wavelength λ, in nanometers, emitted by the quantum dots of example 22 receiving a light radiation having a 460-nm wavelength.

Internal quantum efficiency $QY_{int}$, absorption coefficient Abs, and external quantum efficiency $QY_{ext}$ have been measured. The obtained results are gathered in Table (XIX) hereafter.

TABLE XIX

| $QY_{int}$ (%) | Abs | $QY_{ext}$ (%) |
|---|---|---|
| 80 | 0.98 | 78.5 |

Example 23

The quantum dot solution of example 22 has been used to carry out the surface functionalization step in the autoclave. The surface functionalization has occurred in two steps. First, a surface functionalization of quantum dots by the 3-mercaptopropyltrimethoxysilane coupling agent is carried out. For example, 200 ml of quantum dot solution at a 1 mg/ml concentration are prepared and transferred into an autoclave having a 200-ml volume. The oxygen gas is removed from the quantum dot solution by bubbling the solution with nitrogen $N_2$ until its saturation. The quantum dot solution is then placed in a glove box and 170 mg of 3-mercaptopropyltrimethoxysilane coupling agent are added to the quantum dot solution. The autoclave is then strictly closed, taken out of the glove box, and heated at 170° C. under stirring for 12 hrs. The quantum dots are then recovered by centrifugation and then cleaned with ethanol in excess. The treatment in the autoclave in the presence of the 3-mercaptopropyltrimethoxysilane coupling agent is repeated until the quantum dots form a stable suspension in ethanol. In a second step, the quantum dots resulting from the first step have been dispersed in 200 ml of anhydrous ethanol and transferred into an autoclave. A bubbling with nitrogen $N_2$ until the saturation is reached has also been carried out. The autoclave is placed in a glove box and 250 mg of coupling agent (3-trimethoxysilyl)propyl methacrylate are added to the quantum dot solution. The autoclave is taken out of the glove box and heated at 170° C. under stirring for 12 hrs. An exchange of ethanol solvent with propylene glycol monomethyl ether acetate (PGMEA) has been performed. Quantum dots functionalized by methacrylic groups are thus obtained.

Figure 31:
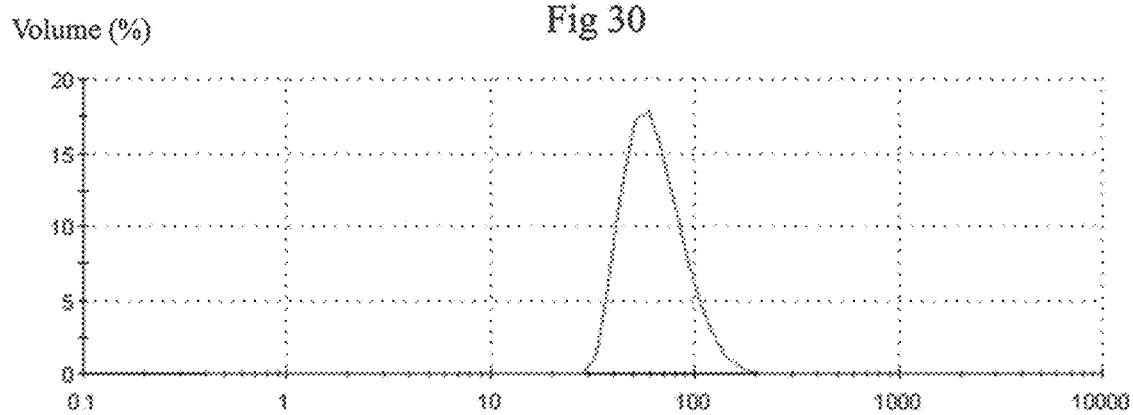

FIG. 31 shows the size distribution curve of nanocrystals in the PGMEA solvent. The average hydrodynamic radius was approximately 66 nm. The average hydrodynamic radius is increased with respect to the quantum dots of example 22.

Figure 32:
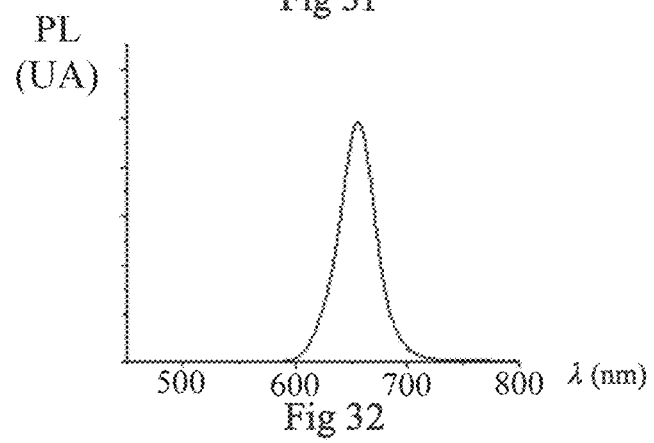

FIG. 32 shows the photoluminescence intensity PF, according to wavelength λ, in nanometers, emitted by the quantum dots of example 23 receiving a light radiation having a 460-nm wavelength. The maximum of the emission band is located at 655 nm.

Internal quantum efficiency $QY_{int}$, absorption coefficient Abs, and external quantum efficiency $QY_{ext}$ have been measured. The obtained results are gathered in Table (XX) hereafter.

TABLE XX

| $QY_{int}$ (%) | Abs | $QY_{ext}$ (%) |
|---|---|---|
| 70 | 0.98 | 68.6 |

Example 24

A quantum dot/photosensitive composition mixture has been formed.

The quantum dot solution of example 23 has been used to form the quantum dot/photosensitive composition mixture. Table (XXI) shows an example of formulation with the mass percentages and the composition of each component.

TABLE XXI

| Component | mass % | composition |
|---|---|---|
| Solvent | 60 | PGMEA |
| Monomer + initiator | 15 | Dipentaerythritol penta-/hexa-acrylate (7.4%) (IGM) + Di(trimethylolpropane) tetraacrylate (7.4%) (sigma Aldrich) + 2,2'-Azobis(2-methylpropionitrile) (0.2%) (Sigma Aldrich) |
| Binder | 10 | Ternary (benzyl methacrylate/methacrylic acid/2-hydroxyethylmethacrylate)copolymer, molar ratio 54/36/10. Acid value = 152 mg of KOH/g. molecular weight = 19,900 g/mol. |
| Scattering particles | 5 | $TiO_2$ nanoparticles (<250 nm, sigma aldrich) |
| Quantum dots | 10 | Quantum dots of example 23 |

The binder of example 23 may be manufactured for example according to the protocol described in reference: *Journal of Applied Polymer Science.* Vol. 109, 467-474 (2008). The mixture of quantum dots with the photosensitive composition of table (XXI) is performed away from daylight under a constant stirring of 300 revolutions per minute. The mixing may also be performed by means of a planetary mixer. Due to such surface methacrylate functions, the quantum dots had a very good affinity for the photosensitive composition. Accordingly, the quantum dots of example 23 formed a stable suspension in the photosensitive mixture. Further, the crosslinkable methacrylate functions located at the surface of the quantum dots provided a better dispersion of the quantum dots in the resin after UV crosslinking.

The preceding examples show that the external quantum efficiency $QY_{ext}$ of the suspension of nanoparticles is substantially increased whatever the chemical natural of the photoluminescent nanoparticles is by implementing a surface treatment with an adapted surface agent.

The invention claimed is:
1. A method of manufacturing nanoparticles of a photoluminescent material, comprising the successive steps of:
 a) forming nanometer-range particles of said photoluminescent material;
 b) forming a dispersion containing the particles in a non-aqueous solvent, the dispersion further containing at least one surface agent;
 c) placing the dispersion in an autoclave at a pressure in the range from 2 MPa to 100 MPa; and
 d) recovering the nanoparticles.
2. The method of claim 1, wherein step b) is preceded by a surface treatment of the nanometer-range particles by a silica precursor.
3. The method of claim 1, wherein the surface agent is an organofunctional compound having the following chemical formula:

where n is equal to 1, 2, or 3, X designates a hydrolysable group, and R is a non-hydrolysable organic group, and where R is capable of binding with a matrix or the solvent or X is capable of binding with the particle surface.
4. The method of claim 3, wherein X is an alkoxy group, a halide group, or an amine group.
5. The method of claim 1, wherein the surface agent is a compound having the following chemical formula: R—Y—R' where Y is a chain, called spacer, comprising at least one atom selected from the group comprising carbon, hydrogen, and oxygen, and R and R' belong to the following chemical groups of thiol (—SH), carboxylic acid (—COOH), hydroxyl (—OH), amine (—NH$_2$), acrylate or non-reactive groups."
6. The method of claim 1, wherein the non-aqueous solvent is an alcohol.
7. The method of claim 1, wherein step a) comprising milling particles of said photoluminescent material having an average size greater than 1 μm to obtain the nanometer-range particles.
8. The method of claim 7, wherein the particles of said photoluminescent material having an average size greater than 1 μm are milled in a wet environment.
9. The method of claim 7, wherein the particles of said photoluminescent material having an average size greater than 1 μm are milled in a solvent different from the non-aqueous solvent used at step b).
10. The method of claim 1, wherein the duration of step c) is in the range from 30 minutes to 48 hours.
11. The method of claim 1, wherein the temperature in the autoclave is in the range from 25° C. to 300° C.
12. The method of claim 1, wherein the photoluminescent material is an aluminate, a silicate, a nitride, an oxynitride, a fluoride, or a sulfide.
13. The method of claim 12, wherein the photoluminescent material mainly comprises an yttrium aluminum oxide or a lutetium aluminum oxide further containing at least one of the following elements: cerium, europium, chromium, neodymium, terbium, dysprosium, praseodymium, or gadolinium.
14. The method of claim 1, further comprising, before step c), a step of mixing and treating in the autoclave nanometer-range particles in the presence of all or part of the precursors used to form the nanometer-range particles.

15. The method of claim 1, further comprising, before step c), a step of mixing the nanometer-range particles with at least one photoluminescent substance.

16. The method of claim 15, wherein the photoluminescent substance is a quantum dot.

17. The method of claim 1, wherein the nanometer-range particles are quantum dots.

18. The method of claim 1, comprising forming, after step d), a stable mixture of the nanometer-range particles with a resist composition.

19. The method of claim 18, wherein the resist is of acrylate type.

20. The method of claim 18, wherein the resist composition further comprises at least one element chosen among a binder, a solvent, a photoinitiator of diffusing particles.

* * * * *